United States Patent [19]
Ishida et al.

[11] Patent Number: 6,003,342
[45] Date of Patent: *Dec. 21, 1999

[54] APPARATUS FOR PRODUCTION OF OPTICAL FIBER PREFORM

[75] Inventors: Yoshinori Ishida; Toshihiro Mikami, both of Ichihara; Yukio Komura, Chiba, all of Japan

[73] Assignee: The Furukawa Electric Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/906,805

[22] Filed: Aug. 6, 1997

Related U.S. Application Data

[63] Continuation of application No. 08/748,721, Nov. 14, 1996, abandoned, which is a continuation of application No. 08/296,938, Aug. 31, 1994, abandoned, which is a continuation of application No. 07/965,063, Oct. 22, 1992, abandoned.

[30] Foreign Application Priority Data

| Oct. 25, 1991 | [JP] | Japan | 3-279274 |
| Oct. 29, 1991 | [JP] | Japan | 3-282821 |
| Oct. 30, 1991 | [JP] | Japan | 3-284561 |
| Jun. 16, 1992 | [JP] | Japan | 4-181931 |
| Jun. 24, 1992 | [JP] | Japan | 4-190048 |
| Aug. 19, 1992 | [JP] | Japan | 4-149972 |

[51] Int. Cl.$^6$ .................................................. C03B 37/023
[52] U.S. Cl. ................... 65/484; 65/425; 65/531; 118/627; 118/638; 361/226
[58] Field of Search ......................... 65/421, 425, 531, 65/484, 377; 361/226, 228; 118/638, 627, 631

[56] References Cited

U.S. PATENT DOCUMENTS

| 3,060,429 | 10/1962 | Winston | 118/627 |
| 3,323,934 | 6/1967 | Point | 118/627 |

(List continued on next page.)

FOREIGN PATENT DOCUMENTS

| 0 127 041 | of 0000 | European Pat. Off. . | |
| 3517450A1 | 11/1986 | Germany . | |
| 3529962 | 3/1987 | Germany | 65/3.12 |
| 35301423 | 2/1978 | Japan | 65/425 |
| 5422841 | 2/1979 | Japan | 65/421 |
| 57-67038 | 4/1982 | Japan . | |
| 58-161936 | 9/1983 | Japan . | |
| 58-217447 | 12/1983 | Japan . | |
| 58-217448 | 12/1983 | Japan . | |
| 156930 | 6/1984 | Japan | 65/3.12 |
| 4300225 | 10/1992 | Japan | 65/3.12 |
| 570166 | 3/1993 | Japan | 65/425 |
| 2079742A | 1/1982 | United Kingdom . | |

OTHER PUBLICATIONS

Translation of Siemens AG 3517450 Nov. 20, 1986.
Translation of Kakumae JE 59–156930 Sep. 6, 1984.
European Search Report.

(List continued on next page.)

*Primary Examiner*—John Hoffmann
*Attorney, Agent, or Firm*—Staas & Halsey LLP

[57] ABSTRACT

Disclosed is a process of producing an optical fiber preform having a step of charging a feedstock gas in an oxygen-hydrogen burner via an electrode and hydrolyzing the same in an oxygen-hydrogen flame to produce particulates containing charged glass particulates and a step of blowing the charged particulates onto a target comprised of a seed rod or a soot body formed on the seed rod so as to cause them to deposit on the target and build up as a soot body. Preferably, the process includes the further step of reducing the magnitude of the charge of the particulates in the burner along with an increase of the diameter of the target which is formed. More preferably, the process also includes the further step of making the position facing the burner across the target an opposite polarity from the charging polarity of the particulates ejected from the burner so as to electrically attract the particulates ejected from the burner.

23 Claims, 24 Drawing Sheets

U.S. PATENT DOCUMENTS

| | | | |
|---|---|---|---|
| 3,691,991 | 9/1972 | Luderer | 118/627 |
| 3,786,309 | 1/1974 | Miottel | 361/227 |
| 3,824,923 | 7/1974 | Fisher | 361/226 |
| 4,125,388 | 11/1978 | Powers | 65/18.2 |
| 4,227,652 | 10/1980 | Itoh | 361/226 |
| 4,259,707 | 3/1981 | Penney | 361/226 |
| 4,414,603 | 11/1983 | Masuda | 361/226 |
| 4,627,867 | 12/1986 | Tanaka | 65/3.17 |
| 4,713,107 | 12/1987 | Yoshida | 65/157 |
| 4,731,103 | 3/1988 | Mizutani | 65/421 |
| 4,979,971 | 12/1990 | Kyoto | 65/900 |
| 5,145,510 | 9/1992 | Saito | 65/900 |

OTHER PUBLICATIONS

Abstract of Japan, Publication No. JP56026741, Mar. 3, 1981.

Abstract of Japan, Publication No. JP2055241, Feb. 23, 1990.

Abstract of Japan, Publication No. JP63242938, Oct. 7, 1988.

Abstract of Japan, Publication No. JP59156930, Sep. 6, 1984.

H₂/O₂ (SLM)

APPARATUS FOR PRODUCTION OF OPTICAL FIBER PREFORM

This application is a continuation of application Ser. No. 08/748,721, filed Nov. 14, 1996, now abandoned, which is a continuation of application Ser. No. 08/296,938, filed Aug. 31, 1994, now abandoned, which is a continuation of application Ser. No. 07/965,063, filed Oct. 22, 1992, now abandoned.

BACKGROUND OF THE INVENTION

1. Field of the Invention

The present invention relates to a process and apparatus for the production of an optical fiber preform used for the production of an optical fiber.

2. Description of the Related Art

A single mode optical fiber, for example, has a core of 10 $\mu$m at its center and a cladding of an outer diameter of 125 $\mu$m formed around the same. Such an optical fiber is produced by heating a porous optical fiber preform having a portion to become the core and a portion to become the cladding and drawing the same to the above-mentioned thickness (or diameter).

As processes for production of a porous optical fiber preform, there are known, for example, the outer vapor deposition method (OVD method) and the vapor axial deposition method (VAD method).

Here, a description will be made of the process of production of a porous optical fiber preform common to the OVD method and VAD method. First, a starting preform comprised of the portion to become the core of the optical fiber or the portion to become the core with a portion to become part of the cladding formed around it is produced. This starting preform is glassified to produce a seed rod (or a starting rod). The seed rod is rotated as a target. An oxygen-hydrogen burner is used to hydrolyze vapor of a feedstock gas such as $SiCl_4$ in the oxygen-hydrogen flame to form particulates including glass particulates such as $SiO_2$. The particulates are blown from the oxygen-hydrogen burner to the rotating target to adhere to and deposit on the soot body to form the cladding on the target. The particulates are continued to be deposited on the deposited soot body from the oxygen-hydrogen burner until the soot body reaches a predetermined outer diameter. The seed rod with the predetermined outer diameter of a soot body formed on it is used as the porous optical fiber preform.

The deposition yield of glass ($SiO_2$) particulates on the target by this process of production of an optical fiber preform is about 20 to 40 percent (%) at most and the deposition speed is about 5 to 10 g/minute, so various processes have been proposed aimed at improving the deposition efficiency, improving the production efficiency, and reducing the production costs. Various processes have also been proposed for improving the quality of the porous optical fiber preform.

Japanese Unexamined Published Patent Application No. 58-161936 discloses a process for production of an optical fiber preform by the OVD method wherein electrodes are laid in the seed rod along the axial center of the same, the seed rod or the soot body formed around the outside of the same is charged with a negative polarity, and the resultant static electricity is used to improve the deposition rate of the glass particulates on the target. This process, however, has the disadvantage that the holes made for laying the electrodes along the axial center of the seed rod remain in the optical fiber after the optical fiber preform is formed, heated, and drawn to produce the optical fiber. Further, in this process, when the outer diameter of the soot body becomes larger, the soot body is charged from inside the seed rod, so when the outer diameter of the soot body becomes larger, the charge on the surface of the soot body falls and there is the problem that an optical fiber preform with a large outer diameter cannot be efficiently produced.

Japanese Unexamined Published Patent Application No. 57-67038, Japanese Unexamined Published Patent Application No. 58-217447, Japanese Unexamined Published Patent Application No. 58-217448, and Japanese Unexamined Published Patent Application No. 60-36341 disclose the OVD and VAD methods of the production of optical fiber preforms, similar to the above method. In particular, Japanese Unexamined Published Patent Application No. 58-217447 discloses the VAD method wherein a high DC voltage is applied to a flow of gas to charge the gas flow with negative ions, the negative ion gas is blown on the surface of the target to charge the target with a negative polarity, and the potential difference is used to cause glass particulates to deposit on the target. Even with these processes, however, it is still not possible to achieve the desired improvement of the deposition yield of glass particulates and the shortening of the production time.

The process disclosed in Japanese Unexamined Published Patent Application No. 58-217447 further suffers from the problem explained below. When glass particulates and ion gas with an opposite polarity are blown on a target, the flow of the glass particulates heading toward the target is obstructed by the flow of the ion gas, so the deposition (yield) of glass particulates on the target falls. Ideally, the opposite polarity ion gas is supposed to cause the surface of the target to be charged to a polarity opposite to the glass particulates so that the glass particulates are drawn to the surface of the target where they are electrically neutralized, but in practice a considerable portion ends up neutralized in the space between the burner and the target and the effects hoped for cannot all be obtained.

SUMMARY OF THE INVENTION

The object of the present invention is to provide a process for the production of an optical fiber preform which greatly improves the deposition of particulates including glass ($SiO_2$) particulates on the target.

Another object of the present invention is to shorten the production time of an optical fiber preform and reduce its production costs.

A still further object of the present invention is to provide a process for production of an optical fiber preform by which the actually usable portion is increased.

A still further object of the present invention is to improve the quality of an optical fiber preform.

A still further object of the present invention is to provide an apparatus for the production of an optical fiber preform for working the above-mentioned process of production of an optical fiber preform.

Therefore, according to a first aspect of the present invention, there is provided a process of producing an optical fiber preform provided with the steps of: hydrolyzing a feedstock gas in an oxygen-hydrogen flame, charging the particulates including glass particulates produced as a result, and blowing the same on a target comprising a seed rod (or a starting rod) or a soot body formed on the seed rod to thereby deposit them on the target to form the soot body.

As the method for charging the particulates, there are two methods; one method being carried out by inserting into the oxygen-hydrogen burner an electrode to which a high voltage is applied, charging the feedstock gas when it passes through the inside of the burner, and ejecting particulates in the above charged state toward the target, and another method being carried out by ejecting particulates from the oxygen-hydrogen burner in an uncharged state and charging the particulates while they are heading toward the target by passing them through electrodes to which a high voltage is applied.

Since charged particulates are blown on the target, the particulates deposit on the target efficiently.

Preferably, there is further provided a step of reducing the magnitude of the charge of the feedstock gas at the burner along with the increase of the diameter of the target. This enables the density of the soot body in the diametrical direction to be made uniform.

More preferably, there is further provided a step of making the position facing the burner across the target the opposite polarity as the polarity of the charge of the particulates and electrically attracting the particulates ejected from the burner. This enables the deposition of the particulates on the target to be further improved.

More preferably, there is further provided a step of clearing the charge from the target. If the target is charged by the particulates, the deposition rate of the new particulates falls, so the charge is cleared so as to ensure the effect of attraction of the static electricity continues.

More preferably, there is further provided a step of reducing the humidity of the atmosphere in which the glass particulates are deposited on the target along with the deposition of the glass particulates on the target. If the humidity rises, the rate of deposition of the particulates on the target falls, so this is prevented.

Preferably, in the state where the target and the burner are made to traverse relative to each other in the longitudinal direction of the target and the target is made to rotate in the direction perpendicular to the longitudinal direction of the target, before blowing the charged glass particulates ejected from the burner to the target, ions charged to an opposite polarity as the polarity of charging of the glass particulates are blown on the target to charge the target to the opposite polarity. Since the target is charged to an opposite polarity as the particulates in advance by the ions, the rate of deposition of the particulates on the target is improved.

More preferably, the surface potential of the target is measured and the amount of ejection of the ions is controlled in response to the measured surface potential or the amount of feedstock gas introduced to the burner is controlled in response to the measured surface potential.

More preferably, the amount of deposition of the glass particulates on the target at the ends of the target is increased. This enables the unusable portions at the ends to be reduced. As the method for increasing the amount of deposition at the ends of the target, (a) the amount of charging of the feedstock gas at the ends of the target is increased or (b) the amounts of supply of the hydrogen gas and oxygen gas at the ends of the target are increased.

More preferably, in the state where the target and the burner are made to traverse relative to each other in the longitudinal direction of the target and the target is made to rotate in the direction perpendicular to the longitudinal direction of the target, the charging of the feedstock gas in the burner is made alternately different in polarity in synchronization with the traverse motion and glass particulates charged with alternate polarities in synchronization with the traverse motion are blown on the target. This enables the surface of the target to be alternately changed in polarity and particulates to be deposited on the target charged with different polarities. As the method for charging, (1) the glass particulates are charged by charging them for a first predetermined time to a positive polarity, not charging them for a second predetermined time, and charging them for a third predetermined time to a negative polarity and cyclically repeating these first to third predetermined times or (2) the glass particulates are charged by charging them for a first predetermined time to a positive polarity and charging them for a second predetermined time to a negative polarity and cyclically repeating these first and second predetermined times.

Further, according to the present invention, there is also provided a process of producing of an optical fiber preform by the VAD method wherein the amount of carrier gas is adjusted to adjust the refractive index of the portion to become the seed rod.

In the present invention, it is possible to suitably combine the above-mentioned methods.

Preferably, the amount of carrier gas is adjusted so as to increase the same along with the elapse of time.

More preferably, when ejecting particulates including glass particulates from a burner in which feedstock gas is introduced and hydrolyzed to eject particulates to form a soot body, the particulates are charged.

Further, according to the present invention, there is provided an apparatus for working the process for producing an optical fiber preform mentioned above.

BRIEF DESCRIPTION OF THE DRAWINGS

The above objects and features and other objects and features will become clearer by the description of embodiments of the present invention explained with reference to the attached drawings, in which.

DESCRIPTION OF THE PREFERRED EMBODIMENTS

First Embodiment

The first embodiment of the present invention will now be explained.

Figure 1:
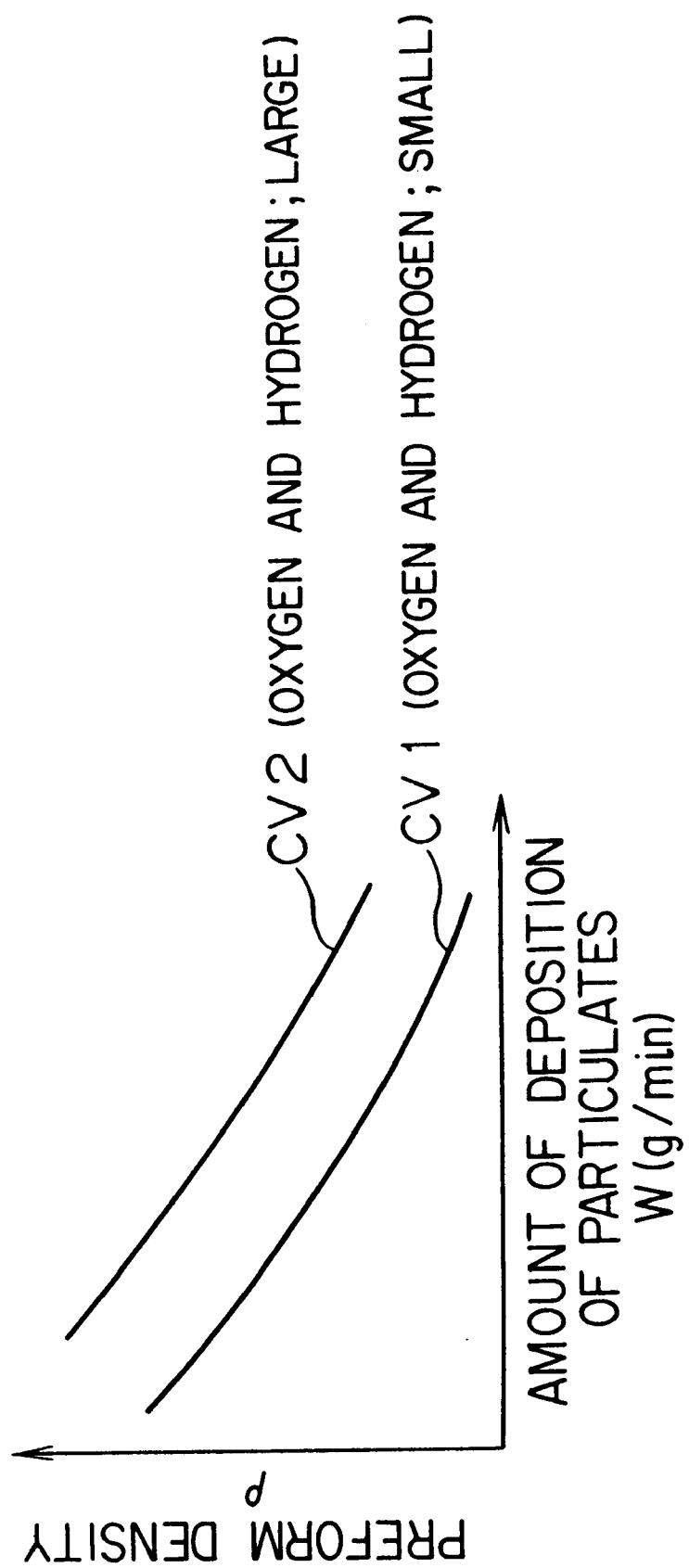
FIG. 1 is a graph illustrating the relationship between the amount of deposition per unit time and density of glass ($SiO_2$) particulates on a target during the production of an optical fiber preform.

Referring to FIG. 1, an explanation will be given of the relationship between the amount w of glass ($SiO_2$) particulates deposited on the target per unit time and the preform density $\rho$ of the optical fiber preform.

As shown by the curve CV1, if the amount w of deposition of the glass particulates on the target per unit time is large, the preform density $\rho$ becomes smaller. This is because the density increasing action of the heat treatment by the oxygen-hydrogen burner on the surface of the optical fiber preform gradually becomes insufficient as the amount w of deposition of the glass particulates per unit time becomes greater. If the amounts of oxygen and hydrogen are increased and the temperature of the flame raised, the preform density $\rho$ becomes large as shown by the curve CV2. That is, as the formation of the soot body forming the target proceeds and the radius r of the optical fiber preform increases, the surface area of the preform becomes larger and the amount w of deposition of the glass particulates on the optical fiber preform per unit time increases remarkably. As a result, the density increasing action of the heat treatment by the oxygen-hydrogen burner on the surface of the optical fiber preform gradually becomes insufficient along with the increase of the outer diameter of the optical fiber preform. Along with the increase of the outer diameter of the optical fiber preform due to the deposition of the glass particulates, the density of the optical fiber preform in the diametrical direction gradually falls along with the increase of the outer diameter of the optical fiber preform due to the deposition of the glass particulates.

On the other hand, the optimum density of the optical fiber preform must be between an upper limit and a lower limit. If the density is too high, dehydrogenation becomes impossible at the time of glassification and if too low, it becomes impossible to maintain the contour shape of the optical fiber preform.

The first embodiment provides a process and apparatus for restraining changes in density of the optical fiber preform in the diametrical direction and producing an optical fiber preform with a uniform density.

Figure 2:
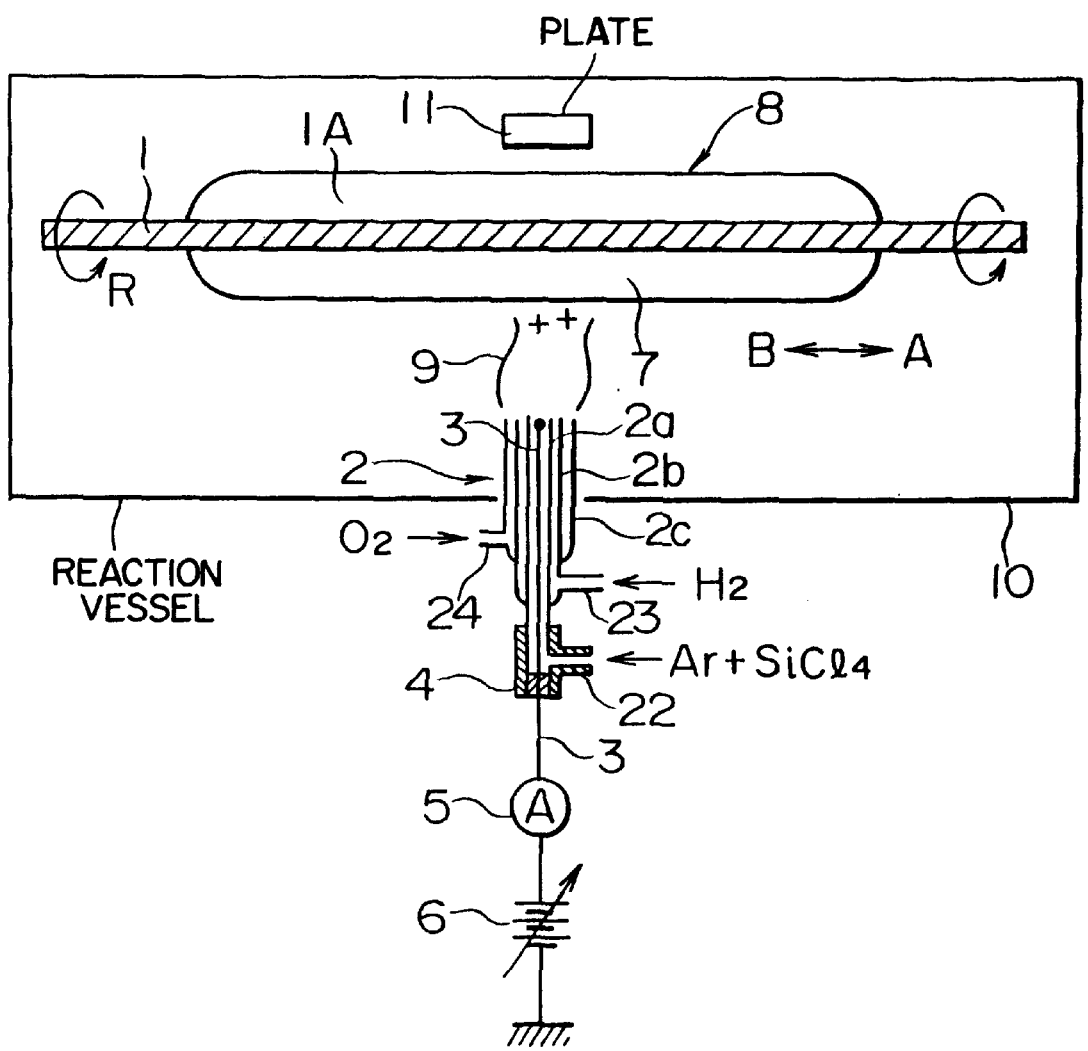
FIG. 2 is a constitutional view of a first embodiment of an apparatus for the production of an optical fiber preform of the present invention.

FIG. 2 is a structural view of an apparatus for production of an optical fiber preform according to the OVD method as the first embodiment of the present invention.

This apparatus for production of an optical fiber preform produces an optical fiber preform which is comprised of the core of the optical fiber alone or the portion to become the core and part of the portion to become the cladding formed around the same and is obtained by using a transparent glassified seed rod (starting rod) 1 as a target and forming the portion to become the cladding on the seed rod.

The seed rod 1 is made to traverse in the longitudinal directions A and B while being rotated in the rotational direction R about the axial center of the same in a reaction vessel 10 in a horizontal state. An oxygen-hydrogen burner 2 is placed facing the outer periphery of the seed rod 1. The oxygen-hydrogen burner 2 is of a three-pipe construction comprised of a combination of an inner pipe 2a, an intermediate pipe 2b, and an outer pipe 2c in a concentric cylindrical arrangement (coaxial form). The feedstock gas, Ar+SiCl$_4$, is supplied to the inner pipe 2a from a feedstock gas insertion port 22. H$_2$ gas is supplied to the intermediate pipe 2b through a hydrogen insertion port 23. O$_2$ gas is supplied to the outer pipe 2c through an oxygen insertion port 24.

In the inner pipe 2a, an electrode 3 is disposed in a concentric cylindrical arrangement with the pipes 2a to 2c. The base end of the inner pipe 2a is insulated and supported by an insulating sealing material 4. The front end of the electrode 3 is made to approach the front end of the oxygen-hydrogen burner 2. The electrode 3 is connected to the positive electrode of a DC high voltage power source 6 through an ammeter 5. The negative electrode of the DC high voltage power source 6 is grounded.

The inventors used this apparatus and performed the following experiments so as to study the effects of accelerating glass (SiO$_2$) particulates by a DC electric field.

(A) Experiment to Investigate Applied Voltage and Amount of Deposition of Particulates Per Unit Time A seed rod 1 of an initial outer diameter of 20 mm and a length of 1 m was rotated at a rotational speed of approximately 300 rpm and was made to traverse to the left and right A and B at a speed of 500 mm/min. Glass particulates 7 were made to deposit on the outer periphery of the seed rod 1 until an outer diameter of 150 mm or so to produce the optical fiber preform 8.

As a first experiment in the first embodiment, the oxygen-hydrogen burner 2 was supplied with oxygen at a rate of 30 SLM, hydrogen at a rate of 80 SLM, argon at a rate of 20 SLM, and SiCl$_2$ at a rate of 10 SLM. At the center of the oxygen-hydrogen burner 2 was inserted a tungsten high voltage electrode 3 of an outer diameter of 1.6 mm to a distance 3 mm inside from the front end of the oxygen-hydrogen burner 2. A DC high voltage of a positive polarity was applied from the DC high voltage power source 6.

Figure 3:
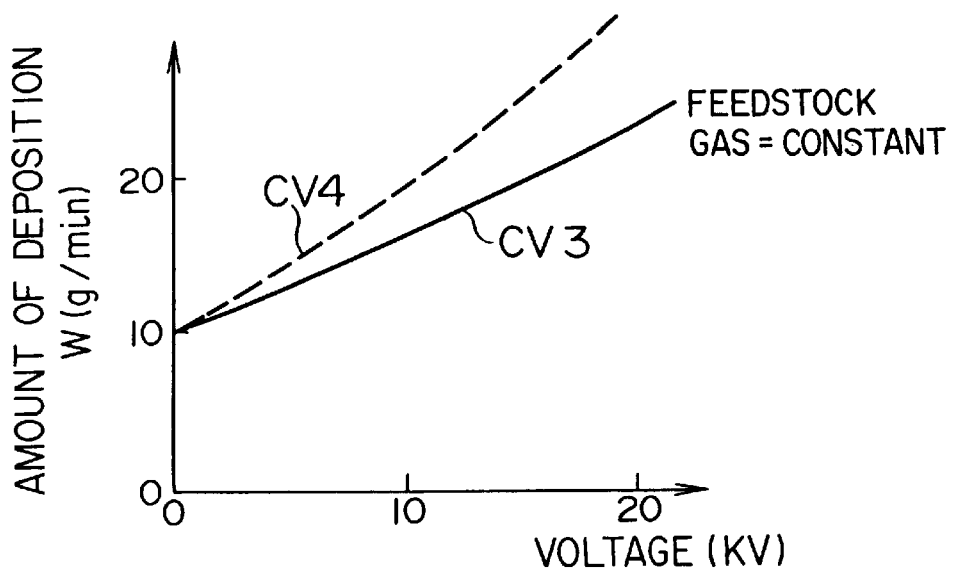
FIG. 3 is a graph of the relationship between the applied voltage and the amount of deposition of glass particulates in a first embodiment of a process for the production of an optical fiber preform of the present invention.

The curve CV3 of FIG. 3 shows the relationship of the amount w of deposition of glass particulates 7 on the seed rod 1 per unit time at voltages of 10 kV and 20 kV applied to the electrode 3 with constant amounts of supply of the feedstock gas.

As clear from the curve CV3 of FIG. 3, the amount of deposition of the glass particulates 7 increased as the voltage applied to the electrode 3 was raised. As opposed to the use of a conventional average amount of deposition of 10 g/min using a high voltage, it was confirmed that the amount of deposition of particulates increased to about 2.5 times that of the conventional amount with application of a voltage of 20 kV. This was due to the fact that in the case of the present embodiment, the glass particulates 7 produced in the flame 9 of the oxygen-hydrogen burner 2 used were charged with a positive polarity and the glass particulates 7 were accelerated by the electric field caused by the positive polarity DC high voltage of the electrode 3 in the oxygen-hydrogen burner 2 and were deposited on the seed rod 1 or the soot body 1A formed on the same.

When a negative polarity voltage was applied to the electrode 3, the amount of deposition of the glass particulates 7 conversely decreased in the case of the feedstock gas of the present embodiment.

At the back surface of the optical fiber preform 8 seen from the oxygen-hydrogen burner 2 side, an earth or negative electrode plate 11 was disposed. By concentrating the high voltage electric field, the amount of deposition of the glass particulates 7 could be further increased. The curve CV4 in FIG. 3 shows the amount of deposition of the glass particulates 7 when disposing a negative polarity electrode plate 11 given a voltage of −10 kV at the back surface of the optical fiber preform 8 seen from the oxygen-hydrogen burner 2 side.

Note that the electrode 3 provided in the oxygen-hydrogen burner 2 need not be provided in the center of the burner 2, but may be also provided at another layer or at the outer circumference. Placing the electrode 3 inside the flame 9 formed by the oxygen-hydrogen burner 2, however, is not preferable in that the high temperature flame 9 is liable to damage the electrode 3 or metal components are liable to become mixed in the optical fiber preform 8. If these problems can be solved, the electrode 3 may also be disposed in the flame 9 as shown by the dashed line in FIG. 2. Further, the shape of the electrode 3 is not particularly critical, but preferably the front end is not pointed so as to prevent discharge of sparks.

The glass particulates 7 were positively charged, so the amount of deposition dropped when a negative polarity voltage was applied to the electrode 3, but when the glass particulates are negatively charged, a negative voltage may be applied to the electrode 3.

(B) Experiment to Investigate Change of Density of Optical Fiber Preform 8 With Respect to Change of Applied Voltage As a second experiment in the first embodiment, it was attempted to raise the amount w of deposition of glass particulates per unit time and make the preform density in the radial direction constant. First, the amounts of oxygen and hydrogen were increased to raise the temperature of the flame 9. When an optical fiber preform 8 was produced under these conditions, it was learned that the preform density became larger as shown by the curve CV6 in FIG. 4.

Figure 4:
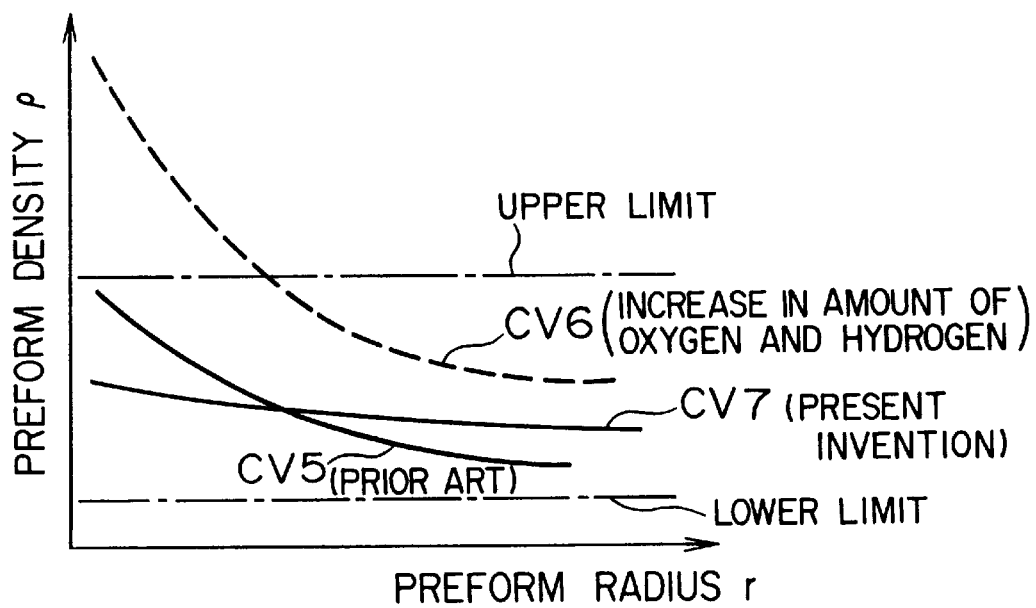
FIG. 4 is a graph of the relationship between the radius of an optical fiber preform and the density of the optical fiber preform in the first embodiment of a process of production of an optical fiber preform of the present invention.
Figure 5:
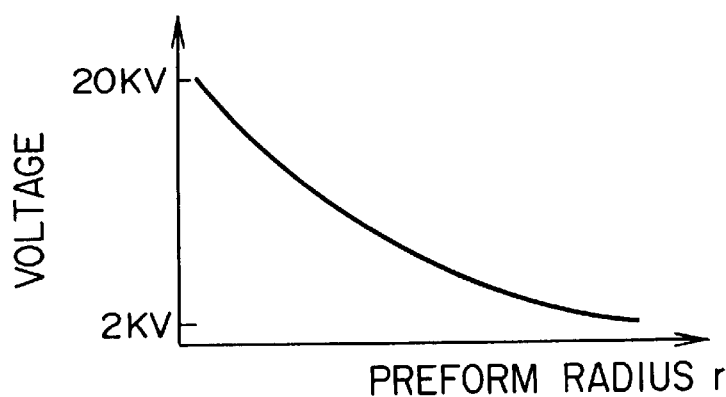
FIG. 5 is a graph of the relationship between the radius of an optical fiber preform and the applied voltage in the first embodiment of a process of production of an optical fiber preform of the present invention.
Figure 6:
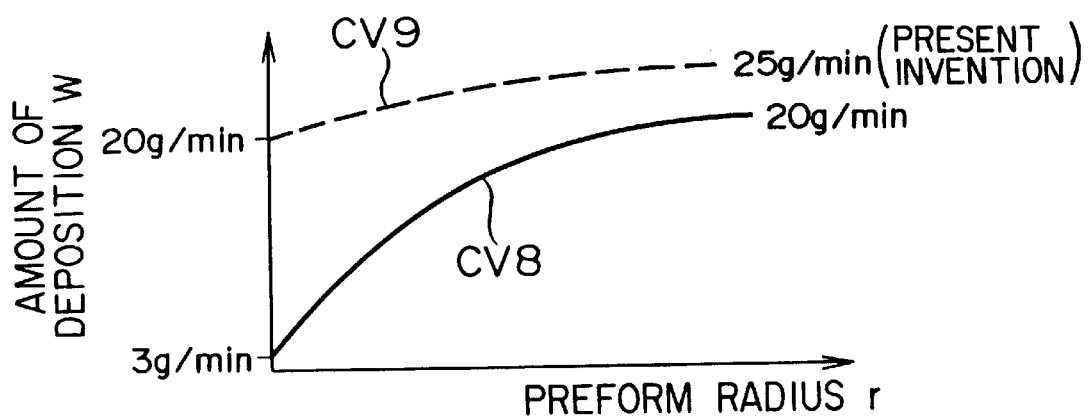
FIG. 6 is a graph of the relationship between the radius of an optical fiber preform and the amount of deposition of glass particulates in the first embodiment of a process of production of an optical fiber preform of the present invention.

Therefore, as shown in FIG. 5, the voltage applied to the electrode 3 provided in the oxygen-hydrogen burner 2 was gradually lowered from 20 kV to 2 kV. As a result, as shown by the curve CV9 in FIG. 6, the amount w of deposition of glass particulates per unit time when the diameter of the preform was small became more than the 20 g/min shown by the curve CV8, more than in the past. The amount w of deposition of glass particulates per unit time did not change greatly along with the increase of the diameter of the preform. As a result, as shown by the curve CV7 in FIG. 4, it was possible to produce an optical fiber preform 8 having a distribution of density between the upper limit and lower limit and substantially constant in the direction of the radius r of the preform. Further, since the glass particulates were accelerated by application of a high voltage to the electrode 3, an average of the amount of deposition of the present invention became 23 g/min as opposed to the average of the conventional amount of deposition of 10 g/min and the total amount of deposition also increased. Note that the curve CV5 in FIG. 4 shows the conventional characteristic curve, while the curve CV6 shows the characteristic curve where the amounts of oxygen and hydrogen supplied to the oxygen-hydrogen burner 2 were increased.

In this way, according to the first embodiment of the present invention, the intensity of the DC electric field for accelerating the glass particulates at the oxygen-hydrogen burner 2 side is made to fall along with an increase of the outer diameter of the target, or the optical fiber preform 1A, so even if the outer diameter of the optical fiber preform 1A increases along with the deposition of the glass particulates, there is no longer any remarkable increase in the deposition speed of the glass particulates on the optical fiber preform 1A and therefore even if the outer diameter of the optical fiber preform increases along with the deposition of the glass particulates, reduction of the deposition density of the glass particulates along with an increase in the diameter is restrained and it is possible to restrain changes in density of the optical fiber preform in the diametrical direction.

Therefore, according to the first embodiment of the present invention, it is possible to easily produce an optical fiber preform with little change in density in the diametrical direction.

Further, since an electrode is disposed inside the oxygen-hydrogen burner and the particulates are accelerated by a DC electric field caused by application of a DC voltage to the electrode, it is possible to restrain damage to the electrode by the high temperature flame from the burner and intermixture of metal components into the optical fiber preform.

The above-mentioned first embodiment showed an optical fiber preform for producing a single mode optical fiber, but the present invention is not limited to a single mode optical fiber and can be similarly applied to other optical fiber preforms as well.

Second Embodiment

A second embodiment of the present invention will now be explained.

The second embodiment solves the problem of the residual holes in the optical fiber at the drawing step of the optical fiber preform in the process of production of an optical fiber preform disclosed in Japanese Unexamined Published Patent Application No. 58-161936 and the problem of peeling and cracking due to the glass particulates and soot body becoming the same polarity and the resultant electrical repulsion action along with progress in the deposition of glass ($SiO_2$) particulates in the process of production of an optical fiber preform disclosed in Japanese Unexamined Published Patent Application No. 57-67038 and Japanese Unexamined Published Patent Application No. 58-217448.

Figure 7:
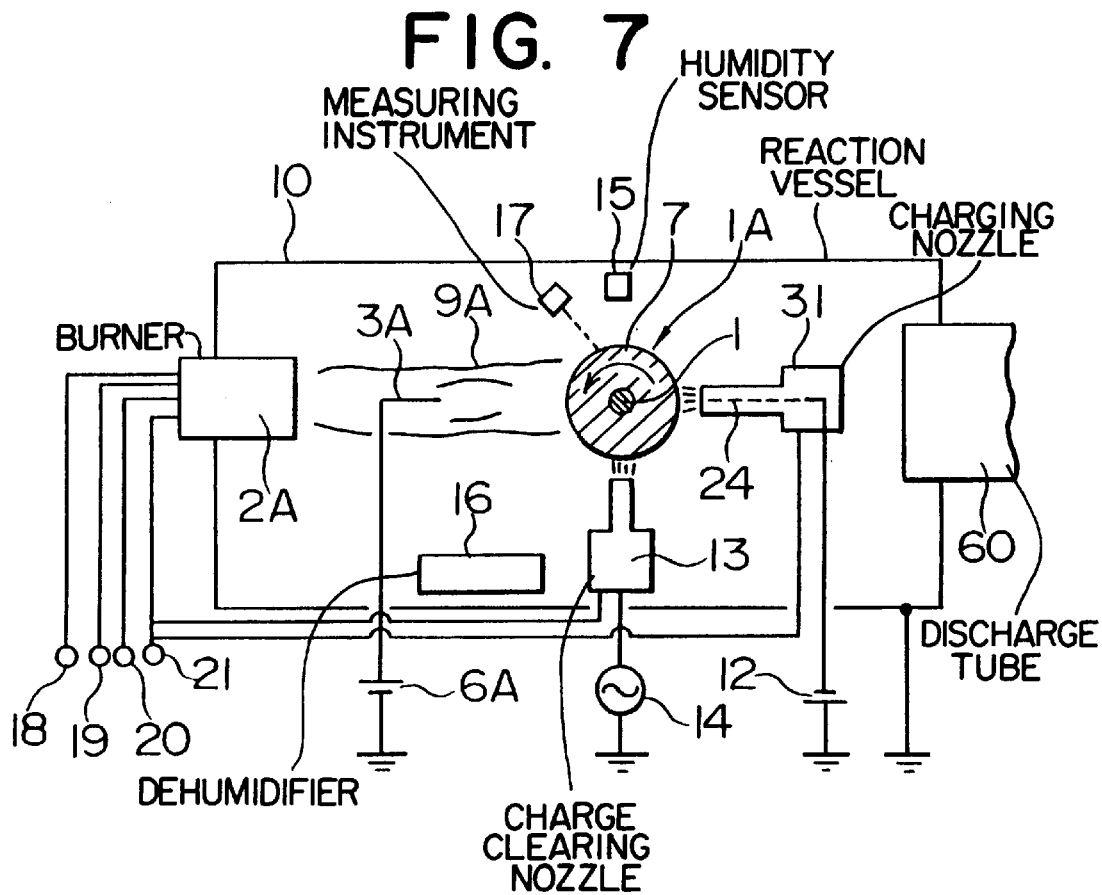
FIG. 7 is a constituent view of a second embodiment of an apparatus for the production of an optical fiber preform of the present invention.

FIG. 7 is a view showing the construction of an apparatus for production of an optical fiber preform by the OVD method in the second embodiment. The apparatus for production of an optical fiber preform, in the same way as shown in FIG. 2, rotates and causes to traverse a seed rod 1 in a reaction vessel 10. A soot body 1A deposits on the surface of the seed rod 1. A five-pipe oxygen-hydrogen burner 2A and a charging nozzle 31 are disposed in the reaction vessel 10 at positions opposing each other across the soot body 1A. The five-pipe oxygen-hydrogen burner 2A is supplied with $O_2$ gas from an oxygen supply source 18, is supplied with $H_2$ gas from a hydrogen supply source 19, is supplied with $SiCl_4$ from a feedstock supply source 20, and is supplied with Ar gas from an argon gas supply source 21. An electrode 3A is disposed in the flame 9A between the five-pipe oxygen-hydrogen burner 2A and the seed rod 1. This electrode 3A is connected to a positive polarity high voltage DC power source 6A. A nozzle electrode 24 is disposed at a charging nozzle 31 and a negative polarity high voltage DC power source 12 is connected to the nozzle electrode. A charge-clearing nozzle 13 is disposed inside the reaction vessel 10, while an AC power source 14 is connected to the charge-clearing nozzle 13.

Regarding the relationship of disposition of the charging nozzle 31, five-pipe oxygen-hydrogen burner 2A, and charge-clearing nozzle 13, the charge nozzle 31, five-pipe oxygen-hydrogen burner 2A, and charge-clearing nozzle 13 are disposed about the seed rod 1 in the direction of rotation of the seed rod 1.

Inside the reaction vessel 10, a humidity sensor 15, a dehumidifier 16, and an outer diameter measuring instrument 17 are disposed. A waste (discharge) tube 60 is provided at the rear side of the charging nozzle 31.

As a first experiment of the second embodiment, the electrode 3A was disposed at a position 5 mm from the five-pipe oxygen-hydrogen burner 4 of an outer diameter of 20 mm. A +5 kV DC voltage was applied from the DC power source 6A. A seed rod 1 of a diameter of 30 mm was placed horizontally at a position 100 mm from the burner 2A and was rotated about its axial center at 200 rpm. A DC voltage of −5 kV was applied from the DC power source 12 to the electrode 24 inside the charging nozzle 31 at the rear side of the seed rod 1 seen from the burner 2A side. Argon gas was blown from the charging nozzle 31 to the seed rod 1 at a rate of 10 l/min. An AC voltage of 200V AC and 50 Hz was applied from the AC power source 14 to the electrode of the charge-clearing nozzle 13 disposed adjacent to the charging nozzle 31. Argon gas was blown from the charge-clearing nozzle 13 to the seed rod 1 at a rate of 5 SLM.

The humidity in the reaction vessel 10 was detected by the humidity sensor 15 and the detection signal was given to the dehumidifier 16 to maintain the inside of the reaction vessel 10 to 50 to 60 percent (%).

To maintain the distance between the surface of the optical fiber preform (soot body) 1A formed by the deposition and accumulation of the glass particulates 7, the charging nozzle 31, the burner 2A, and the charge-clearing nozzle 13 constant, the surface position of the optical fiber preform 1A during growth was detected by the outer diameter measuring instrument 17 and the signal was fed back to an actuator, not shown, driving the charging nozzle 31, burner 2A, and charge-clearing nozzle 13.

$SiO_2$ particulates were produced in an oxygen-hydrogen flame 9A under conditions of a bubble temperature of the SiCl$_4$ of 50° C., 2 l/min of carrier Ar gas, 14 l/min of H$_2$ gas, 6 l/min of sealing Ar gas, and 15 l/min of O$_2$ gas. The particulates were made to deposit on the seed rod 1 to produce an optical fiber preform 1A. At this time, 15 grams were deposited in one minute (38% deposition efficiency). Further, regarding the surface state of the optical fiber preform 1A, no unevenness, cracks, etc. were seen and the state was therefore excellent.

If the burner side electrode 3A was not used as in the past, 10 grams were deposited in a minute (25% deposition efficiency) under the same gas conditions as mentioned above.

On the other hand, when the charge-clearing nozzle 31 was not used, 8 grams were deposited in a minute (20% deposition efficiency) under the same gas conditions as mentioned above.

Figure 8:
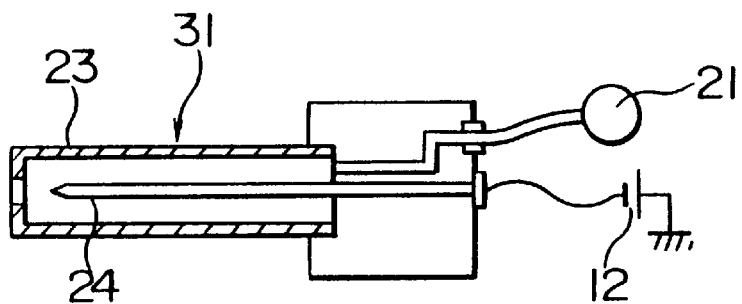
FIG. 8 is a constituent view of an electrode illustrated in FIG. 7.

FIG. 8 shows a specific example of the construction of the above-mentioned charging nozzle 31. The charging nozzle 31 is constructed with a nozzle electrode 24 disposed coaxially about a cylindrical nozzle body 23, to which a nozzle body 23 is supplied Ar gas from the argon gas 21 and to which a nozzle electrode 24 is applied a DC voltage from the DC power source 12. Note that the gas supplied to the nozzle body 23 may be, in addition to Ar gas, He gas, N$_2$ gas, or other inert gases. The flame may be obtained by burning hydrogen, hydrocarbons, etc.

The nozzle body 23 of the charging nozzle 31 is not electrically grounded. The nozzle body 23 may also be formed by an electrically insulating material.

Figure 9:
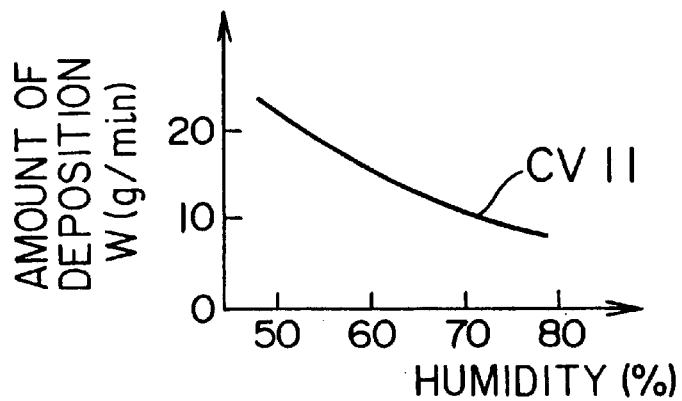
FIG. 9 is a graph of the relationship of the humidity and amount of deposition of glass particulates in a second embodiment of a process for production of an optical fiber preform of the present invention.

When the relationship of the humidity inside the reaction vessel 10 and the amount w of deposition of the glass particulates 7 was investigated, the results shown in FIG. 9 were obtained. As clear from FIG. 9, the lower the humidity inside the reaction vessel 10 becomes, the more the amount of deposition of glass particulates 7 on the soot body 1A increases. Therefore, by sending in dry air inside the reaction vessel 10, it is possible to obtain even better results in the face of an increase of the amount of deposition of the glass particulates 7.

Figure 10A:
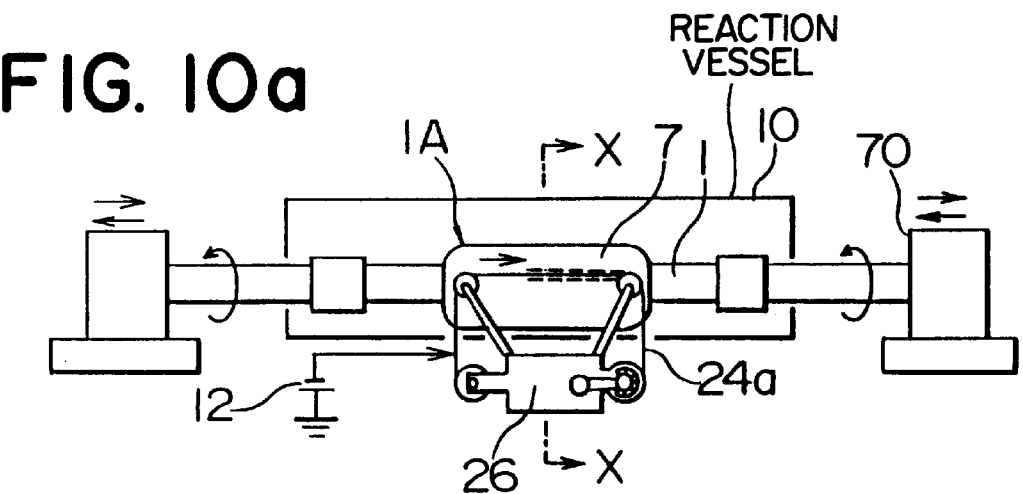
FIGS. 10a and 10b are constituent views of modifications of the second embodiment of an apparatus for production of an optical fiber preform of the present invention.
Figure 10B:
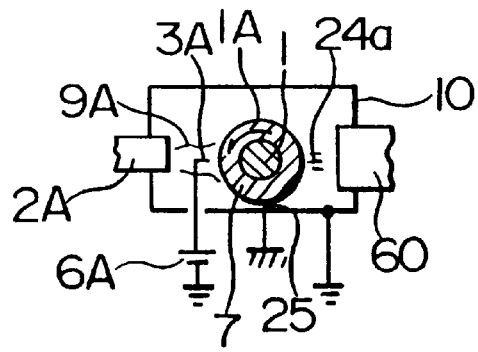

As a second experiment, as shown in FIG. 10A and FIG. 10B, a wire electrode 24a was used instead of the charging nozzle 31 and a grounded needle 25 was used instead of the charge-clearing nozzle 13. A DC voltage of −5 kV was applied to the wire electrode 24, but otherwise the same conditions were used as in the embodiment shown in FIG. 7 to produce SiO$_2$ particulates 7 and cause them to deposit on the seed rod 1, whereupon 13 grams were deposited in a minute (33% deposition efficiency). The surface state of the optical fiber preform 1A was also excellent.

In this case, the glass particulates 7 deposited on the wire electrode 24a as well, so to prevent a reduction of the effect of the static electricity, a wire electrode feed apparatus 26 was provided so as to continuously feed bare wire electrode 24a to the optical fiber preform 1A.

Figure 11:
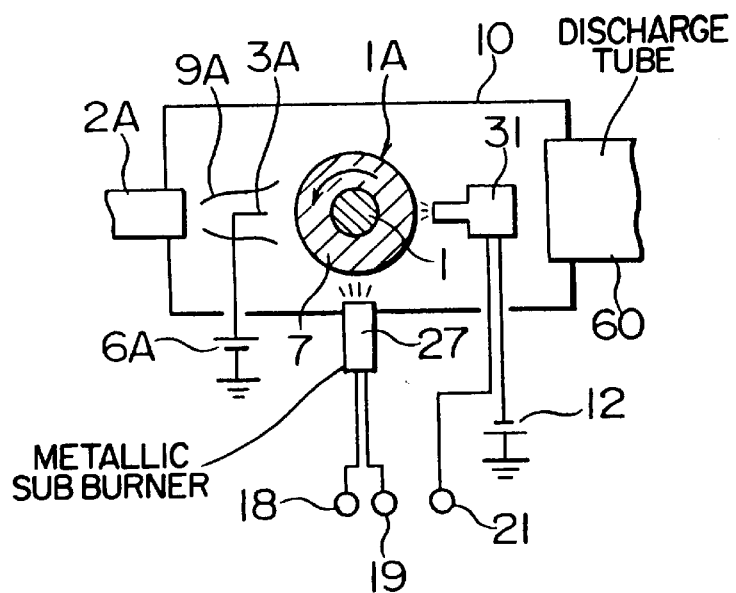
FIG. 11 is a constituent view of another modification of the second embodiment of the apparatus for production of an optical fiber preform of the present invention.

As a third experiment, as shown in FIG. 11, instead of the charge-clearing nozzle 13, the housing of the metallic sub-burner 27 was electrically grounded. The sub-burner 27 was connected to an oxygen source 18 and a hydrogen source 19 and an oxygen-hydrogen flame (H$_2$: 2 l/min, O$_2$: 11 l/min) was ejected from the sub-burner 27 and blown onto the seed rod 1. Using other conditions the same as in the experiment shown in FIG. 7, 13 grams were deposited in a minute (33% deposition efficiency) and the surface state of the optical fiber preform 1A was excellent. The density of the resultant optical fiber preform 1A was greater than the case of the experiments mentioned with reference to FIG. 7 and FIGS. 10A and 10B.

Figure 12:
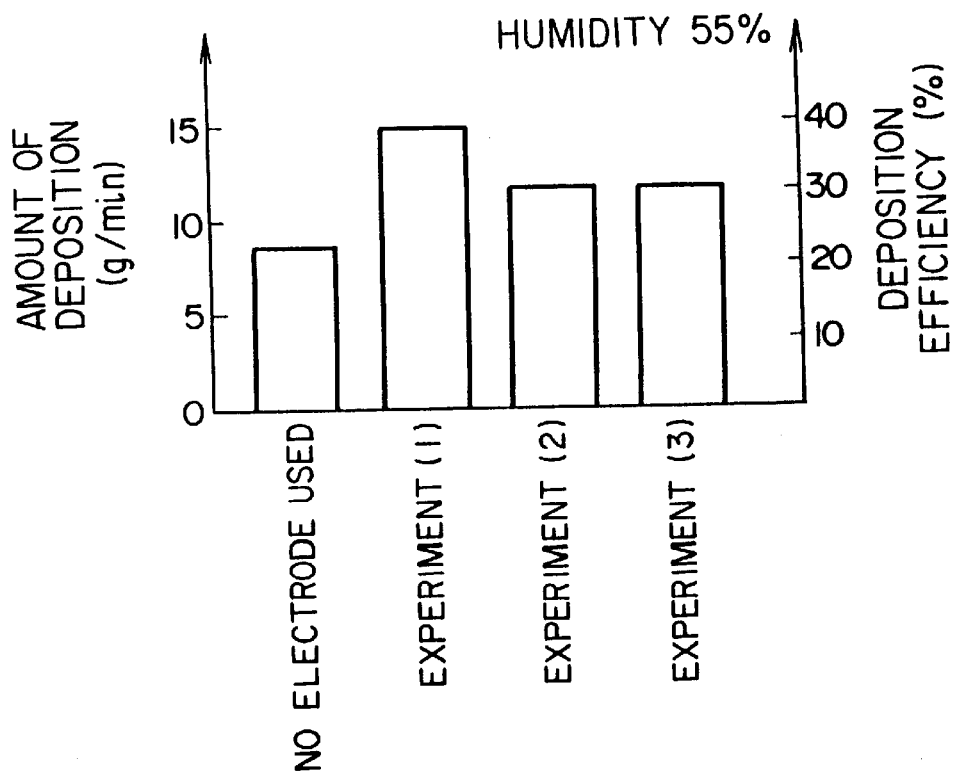
FIG. 12 is a graph of the amount of deposition of glass particulates according to the process of production of an optical fiber preform of the present invention.

FIG. 12 is a graph showing a comparison of the amount of deposition of glass particulates and the deposition efficiency of an example of the prior art where no electrode is used and the above first to third experiments. The humidity inside the reaction vessels in these cases was 55 percent (%).

As explained above, according to the second embodiment of the present invention, since an electrode of a polarity electrically attracting the glass particulates, for example, a charging nozzle, is disposed at the rear side of the seed rod as seen from the burner side and the electrode is used to converge the glass particulates and deposit them on the seed rod, it is possible to make the glass particulates deposit on the seed rod efficiently without making holes in the seed rod.

Further, according to the second embodiment of the present invention, since the glass particulates are made to deposit on the optical fiber preform while clearing the charge from the optical fiber preform, it is possible to produce the same without cracks arising in the optical fiber preform due to static electricity.

Still further, according to the second embodiment of the present invention, by controlling the humidity inside the reaction vessel accommodating the seed rod, it is possible to produce an optical fiber preform while stabilizing the action due to the static electricity.

Third Embodiment

A third embodiment of the present invention will now be explained.

The third embodiment relates to a process and apparatus for the production of an optical fiber preform which enables the production of an optical fiber preform having a uniform distribution of refractive index.

The amount and distribution of the particulates depositing on the target change due to various factors such as the shape of the burner flame and the temperature of the preform surface. Up to now, production of a stable level of optical fiber preforms has been realized by studying the above various factors, but when controlling the distribution of the refractive index in the VAD method, there is some fluctuation, though slight, in the quality caused by the fluctuation in the feedstock gas etc. The control of the feedstock gas in this conventional method was generally by the bubbling method, wherein a carrier gas controlled in amount of flow by a mass flow controller is blown into the feedstock solution in the temperature-controlled tank and is carried to the burner. In this conventional method, however, the stability ends up determined by the control of the flow of the carrier gas and tank temperature at locations extremely far from the burner. There are the problems that the amount of the glass particulates generated at the burner is not ensured and a stable distribution of the refractive index is not obtained.

The third embodiment provides an optical fiber preform enabling a stable distribution of the refractive index to be obtained.

Figure 13:
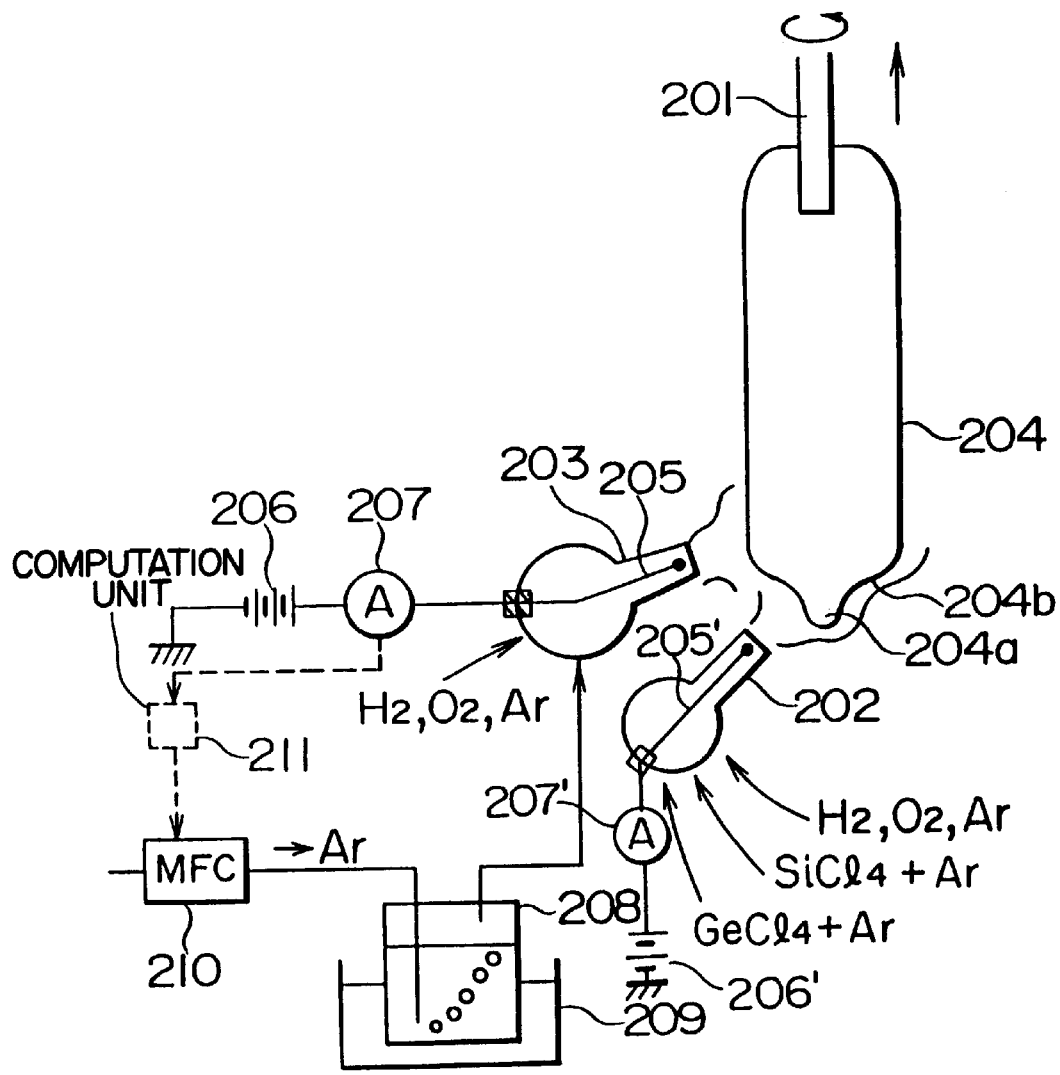
FIG. 13 is a constituent view of a third embodiment of the apparatus for production of an optical fiber preform of the present invention.

An embodiment in the case of the VAD method is explained. In the VAD method, as shown in FIG. 13, the seed rod 201 inserted into the reaction vessel (not shown) is lifted up while being rotated, core-use glass particulates comprised of SiO$_2$ and GeO$_2$ and cladding-use glass particulates comprised of SiO$_2$ alone, formed in the flame at the front ends of the core burner 202 and the cladding burner 203, are made to deposit on the seed rod 201, and thus a porous optical fiber preform 204 comprised of the core portion 204a and the cladding portion 204b is formed.

As the core burner 202 and the cladding burner 203, use is made of four-pipe burners. Tungsten electrodes 205 of an outer diameter of 1.6 mm are inserted into the center layers (inner diameter 4 mm) where the feedstock gas flows, and a high voltage of 0 to ±25 kV can be applied from the high voltage DC power source 206. An ammeter 207 for measuring the minute current (max 100 µA) flowing through the electrode 205 is connected in series to the electrode 205. In FIG. 13, an electrode 205' can be inserted into the core burner 202, and a high voltage DC power source 206' and an ammeter 207' can be provided for the core burner 202.

In this embodiment, the value of the current is measured taking note of the cladding burner 203. The cladding burner 203 is supplied with 10 SLM of hydrogen gas, 9 SLM of oxygen gas, 1 SLM of argon gas, and 1 g/min of $SiCl_4$ (carrier gas: 800 SCC of argon). The $SiCl_4$ gas (vapor) is formed by placing a tank 208 containing an $SiCl_4$ solution in a constant temperature tank 209, supplying argon carrier gas into the $SiCl_4$ solution through a mass controller 10, and bubbling the argon carrier gas.

Figure 14:
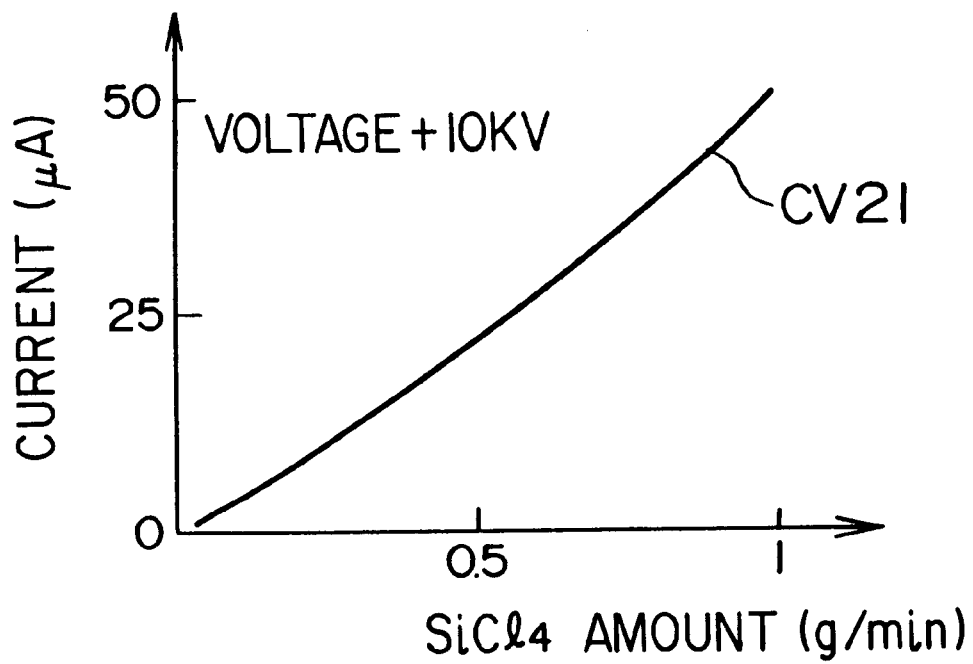
FIG. 14 is a graph of the relationship between the feedstock and current in a third embodiment of a process for the production of an optical fiber preform of the present invention.

The change in the current when the voltage applied to the electrode 205 is fixed to +10 kV and the flow of the $SiCl_4$ is changed becomes as shown by the curve CV21 of FIG. 14. It was discovered that the larger the flow, the greater the current that flowed. With a flow of 1 g/min of $SiCl_4$, a current of approximately 50 µA flowed.

Figure 15:
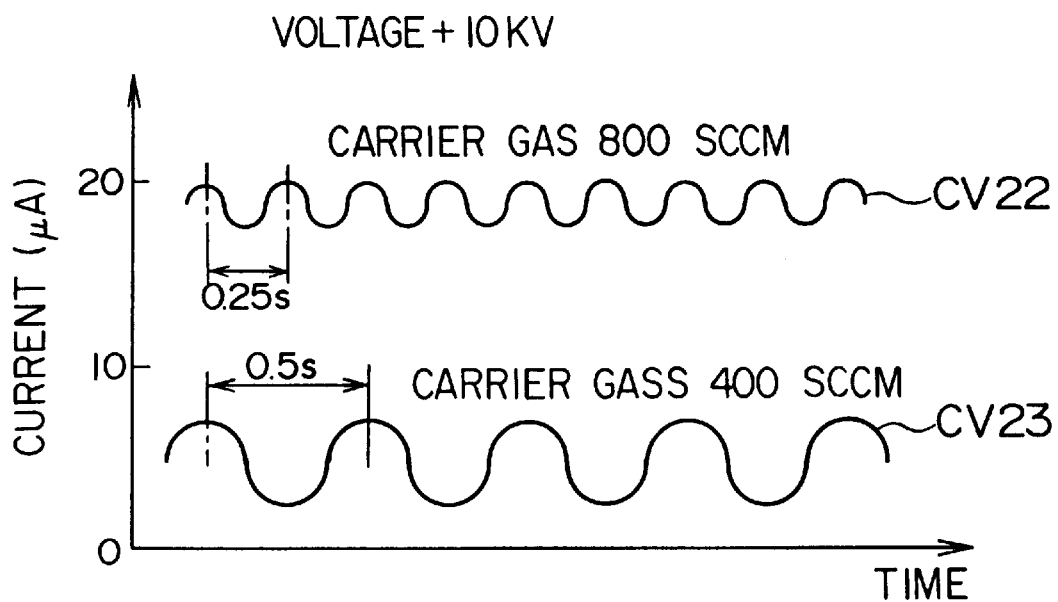
FIG. 15 is a graph of the relationship between the elapsed time and current with respect to changes in the amount of carrier gas.

FIG. 15 is a graph showing the changes over time of the current measured by the ammeter 207. As shown by the curve CV22, when the flow of the argon carrier gas is made 800 SCCM, a fluctuation of current of ±1 µA occurs at a cycle of 0.25 second. When the flow of the argon carrier gas was changed from 800 SCCM to one-half of that, i.e., 400 SCCM, the fluctuation of the cycle became two times the previous amount, i.e., 0.5 second, as shown by the curve CV23. This is believed to be due to the occurrence of air bubbles due to the bubbling. It is deduced that this leads to fluctuations in the amount of deposition of the particulates on the optical fiber preform 204.

Figure 16:
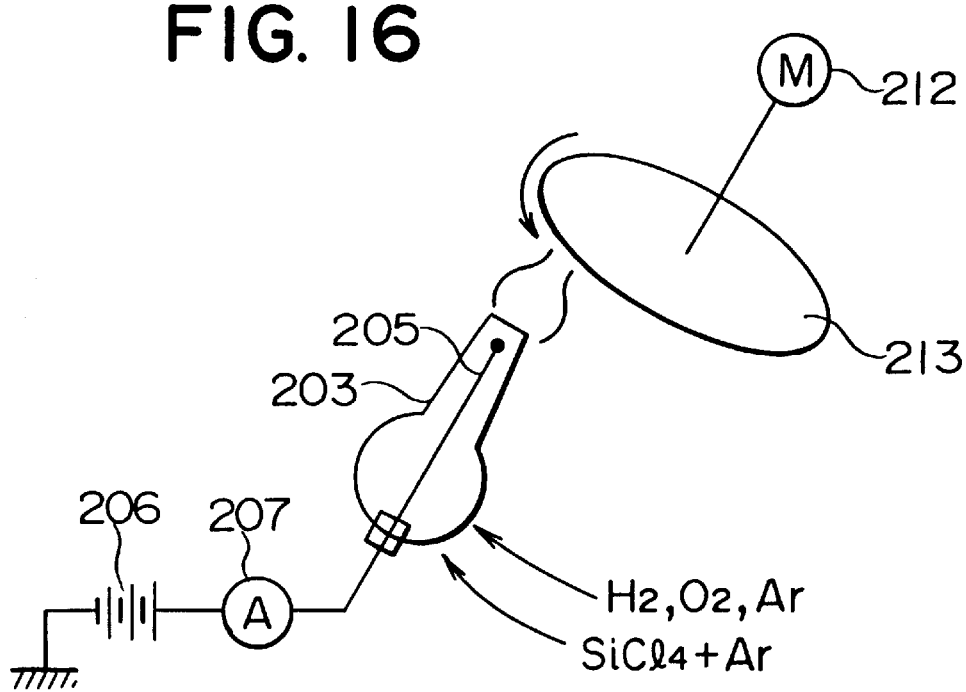
FIG. 16 is a view of an arrangement for verifying the experimental results of the third embodiment of an apparatus for production of an optical fiber preform of the present invention.
Figure 17:
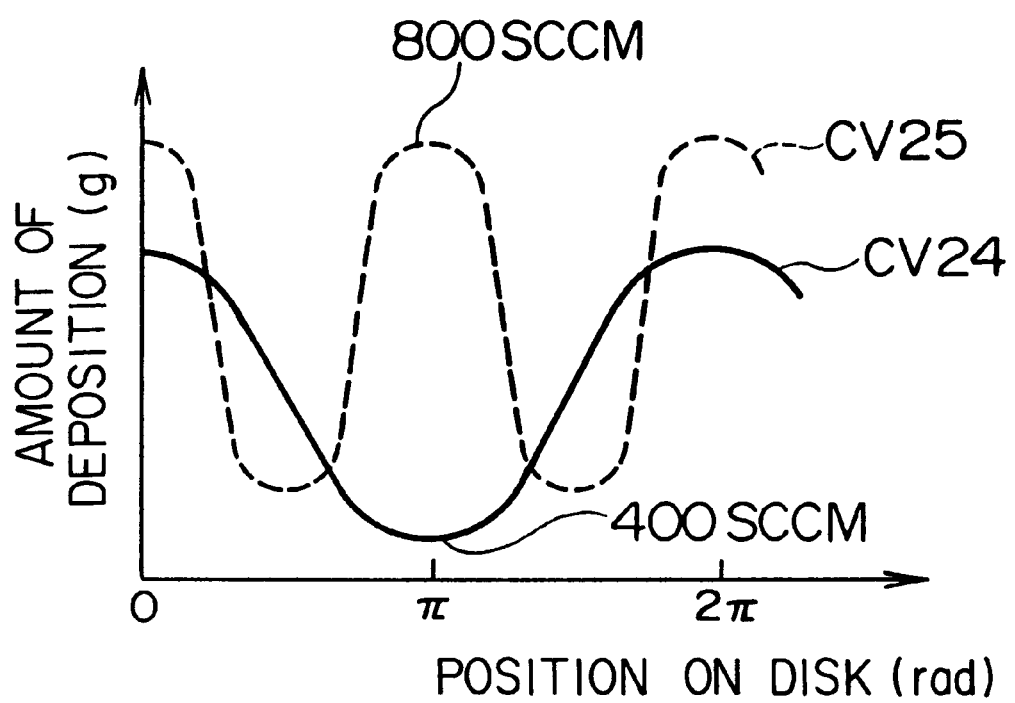
FIG. 17 is a graph of the relationship between the position in the apparatus for production of an optical fiber preform shown in FIG. 16 and the amount of deposition of glass particulates.

Since it is difficult to measure such slight fluctuations during actual synthesis of the optical fiber preform 204, the experiment shown in FIG. 16 was performed. A motor 212 was used to rotate a disk 213 and $SiO_2$ particulates synthesized in the flame of the burner 203 were made to deposit on the disk 213. At this time, a rotational speed synchronized with the former fluctuation was given to the disk 213. The curve CV24 of FIG. 17 shows the changes in the amount of deposition in the circumferential direction when depositing $SiO_2$ particulates on the disk 213 for a predetermined time at 120 rpm and 400 SCCM carrier gas. There was one portion seen on the disk 213 where the amount of deposition was large and it was learned that the flow of the feedstock gas fluctuated. When performing this by 800 SCCM of carrier gas, two peaks appeared as shown by the curve CV25.

Figure 18A:
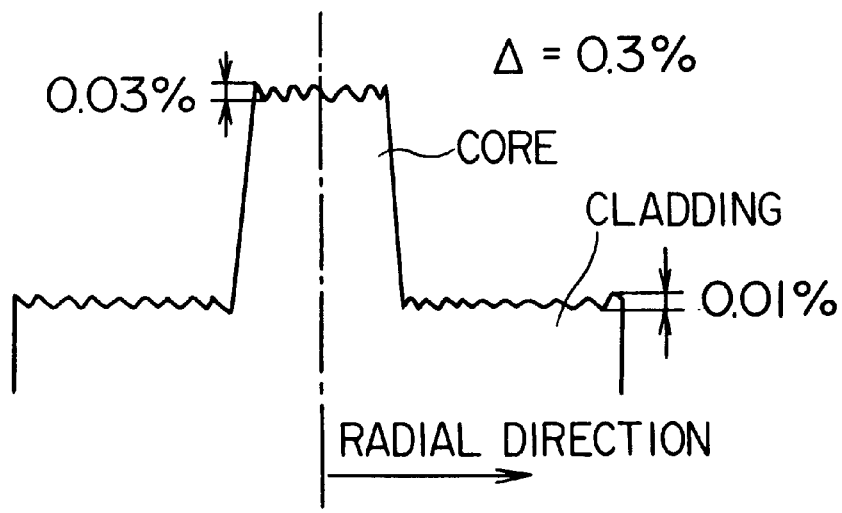
FIG. 18a is a graph of the results of a conventional process for production of an optical fiber preform and FIG. 18b is a graph of the results of a process for production of an optical fiber preform according to the third embodiment of the present invention.

The distribution of the difference of the refractive index (A) of the core and cladding when actually producing an optical fiber preform by the prior art process is shown in FIG. 18a. A fluctuation of 0.01 to 0.03 percent is seen with respect to a design value of the difference of the refractive index Δ=0.3%. The reason for this is believed to be the fluctuation in the supply of the feedstock.

Figure 19:
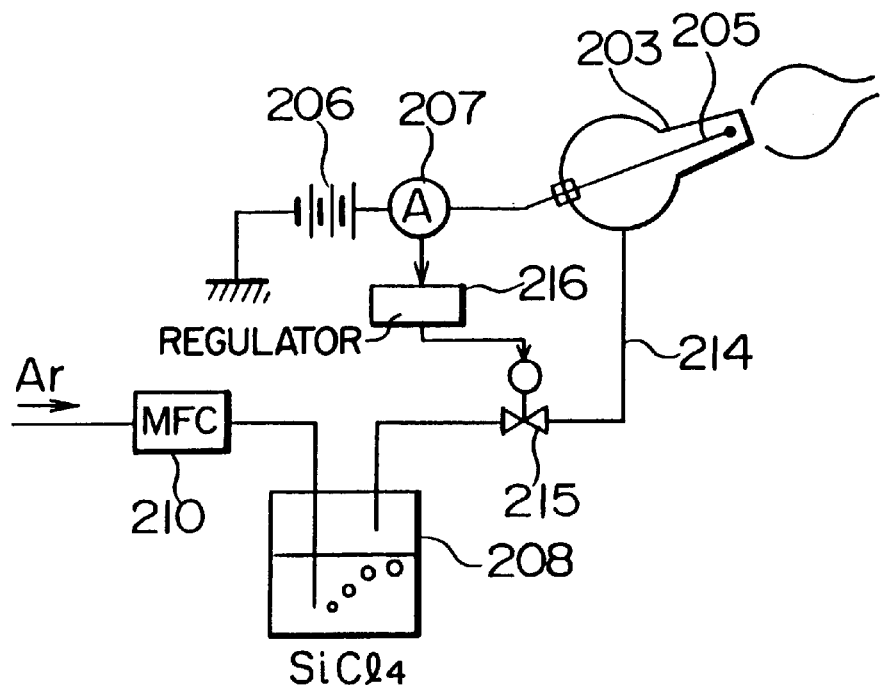
FIG. 19 is a constituent view of another modification of the third embodiment of an apparatus for production of an optical fiber preform of the present invention.

FIG. 19 is a view showing the construction of an apparatus designed to suppress the fluctuations in the supply of the feedstock. A high speed response piezovalve 215 is provided at the feedstock gas supply line 214 from the tank 208 and the opening of the piezovalve 215 is controlled by a regulator 216 so that the current flowing to the electrode 205, measured by the ammeter 207, becomes constant.

Figure 18B:
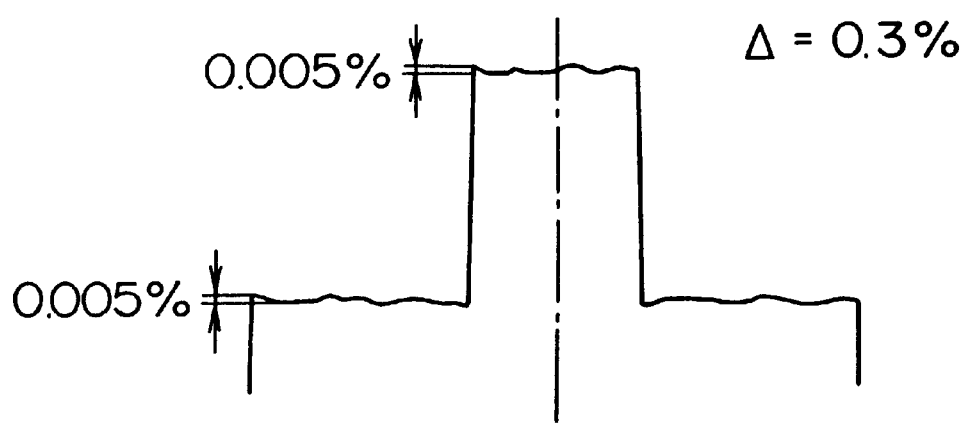
Figure 20:
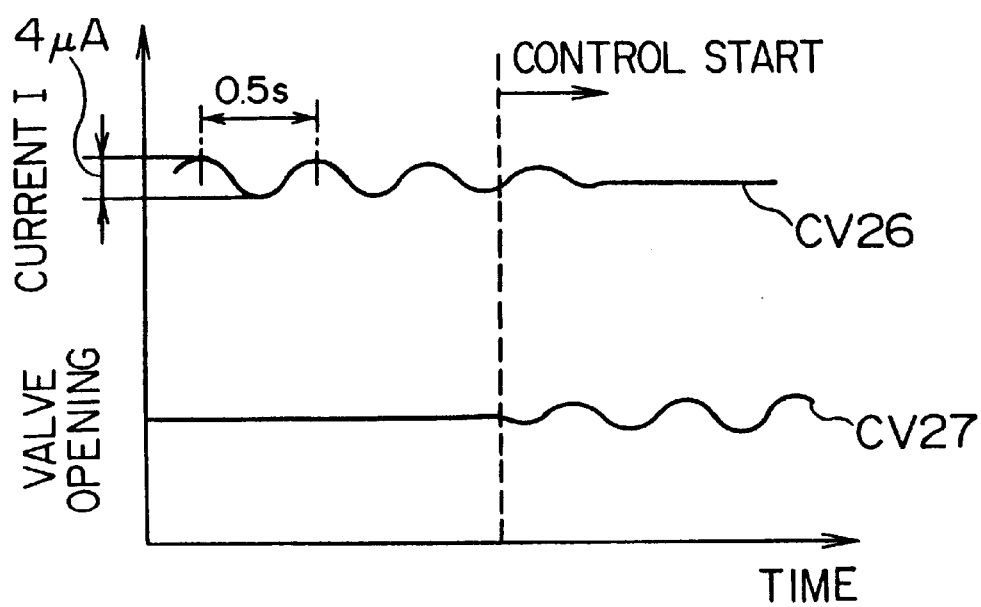
FIG. 20 is a graph of the changes in current with respect to changes in the valve opening in the third embodiment of the present invention.

FIG. 20 is a graph showing the relationship between the current at the times of opening or closing of the piezovalve 215 and the opening of the piezovalve 215. When the valve is not controlled, fluctuation of the current occurs in 0.5 second cycles, but when the valve starts to be controlled and the opening of the valve 215 is changed at a high speed, it becomes possible to suppress the fluctuations in the current value. As a result, as shown by FIG. 18b, the fluctuation in the distribution of the refractive index of the optical fiber can be held to less than 0.005 percent with respect to a design value of the difference of the refractive index Δ=0.3%.

By this experiment, the method of measurement of the flow by the present invention becomes extremely sensitive and the sensor is in the burner, so, it is learned, it becomes possible to measure slight fluctuations in flow, unable to be detected up to now, closer to the optical fiber preform. By devising measures to suppress this fluctuation, it becomes possible to stabilize the quality of the optical fiber preform to an extent never before possible in the past.

A second example of the third embodiment will now be explained.

The first example of the third embodiment, it was explained, enabled monitoring of the extremely small fluctuations caused by bubbling. In the second example, an explanation is made of an example of the case where the flow of the carrier gas is controlled to as obtain a constant amount of generation of glass particulates at the burner, which changes along with changes in the liquid surface level of the feedstock tank.

Figure 21:
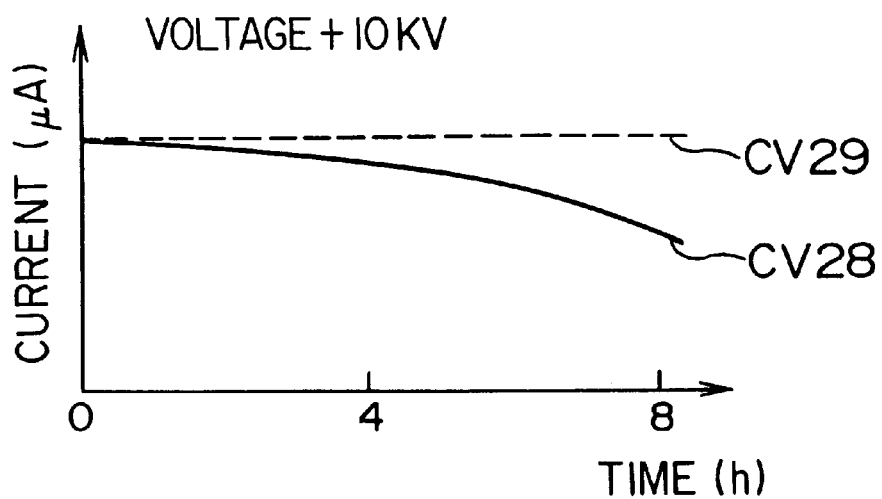
FIG. 21 is a graph of the changes in current with respect to changes in time in the third embodiment of the present invention.
Figure 22:
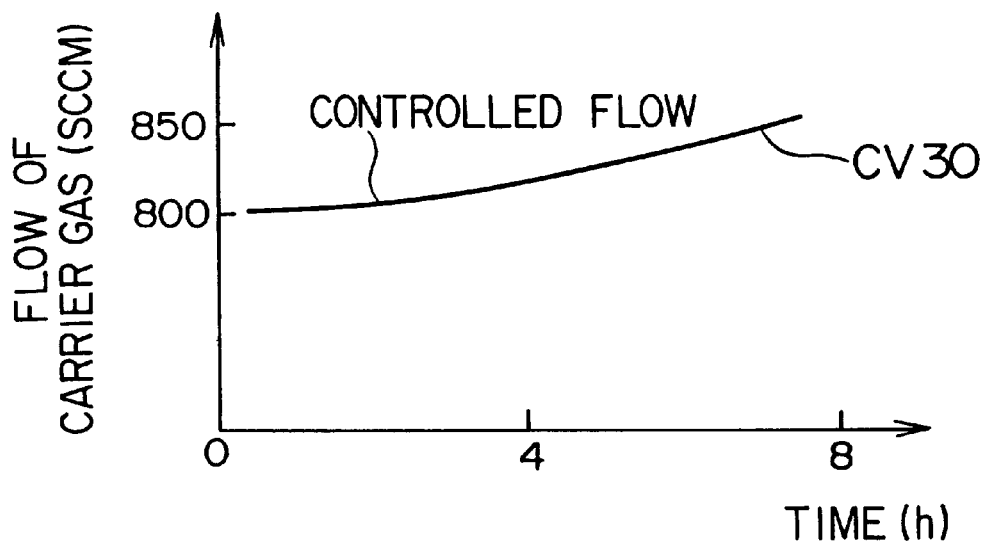
FIG. 22 is a graph of the changes in flow with respect to the changes in time in the third embodiment of the present invention.

In the second example as well, an optical fiber preform is synthesized under similar conditions as the first example. The solid line CV28 of FIG. 21 records the current of the electrode in the burner during synthesis of the glass particulates. As clear from the figure, the current falls along with time. This means that the amount of generation of the glass particulates at the burner falls. The reason is believed to be the change in the liquid surface level of the feedstock solution tank. As shown in FIG. 22, by controlling the flow of the carrier gas in a direction gradually increasing from 800 SCCM, it becomes possible to maintain the current constant and maintain the amount of generation of the glass particulates at the burner constant, as shown by the broken line 29 of FIG. 21.

In the above embodiment, as shown in FIG. 19, the current flowing to the flame of the cladding use burner 203 is measured by the ammeter 207 and the flow of the feedstock gas supplied to the burner 203 is controlled based on the measurement value, but of course it is also possible to perform similar control for the core-use burner 202, and a control for the both burners 202 and 203.

Further, as shown in FIG. 13, by supplying to an computation unit 211 a measurement output of the ammeter 207 connected to the electrode 205 of the cladding use burner 203 and controlling a mass flow controller 210 by the results of the calculation of the computation unit 211, it is also possible to control the flow of the feedstock gas through the carrier gas so that the measurement output of the ammeter 207 becomes substantially constant. The same applies to the core-use burner 202.

Note that it is also possible to place a grounding electrode at the rear side of the target (optical fiber preform) seen from the burner side and apply a DC voltage between the burner side electrode and the electrode adjoining the target so as to pass the current. In this case, the ammeter may be positioned at the latter electrode.

As explained above, according to the third embodiment of the present invention, it is possible to obtain the following effects.

Since the current flowing through the particulates between the burner and target is measured and the flow of the feedstock gas is controlled so that the current becomes substantially constant, the amount of the particulates supplied to the target is stable and it is possible to easily produce an optical fiber preform which can give a stable distribution of the refractive index.

The current is measured by providing an electrode in the burner, applying a DC voltage between the electrode and the target or an electrode adjoining the target, and connecting an ammeter to the electrode, so it is possible to easily measure the current flowing between the electrode on the burner side and the target or the electrode adjoining the target.

Fourth Embodiment

An explanation will now be made of a process and apparatus for the production of an optical fiber preform by the OVD method as a fourth embodiment of the present invention.

The fourth embodiment has as its object to resolve, for example, the problems in the process of production of an optical fiber preform disclosed in Japanese Unexamined Published Patent Application No. 58-217447 and improve the deposition rate of glass ($SiO_2$) particulates on the soot body and shorten the production time.

Figure 23:
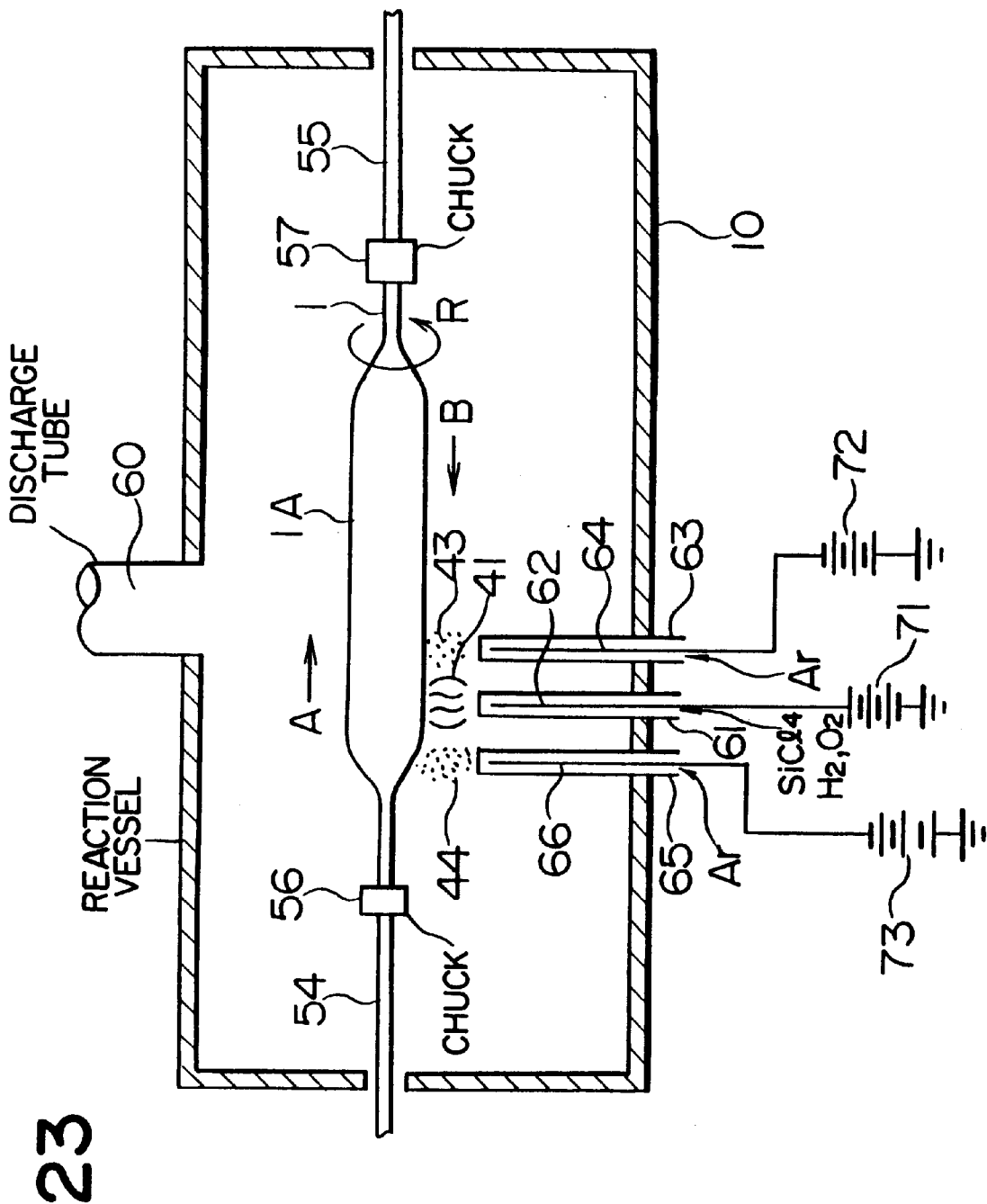
FIG. 23 is a constituent view of a fourth embodiment of an apparatus for production of an optical fiber preform of the present invention.

FIG. 23 is a view showing the construction of an apparatus for the production of an optical fiber preform as the fourth embodiment of the present invention.

The apparatus for production has an discharge tube (hood) 60 provided at the top of the bell jar 10, a burner 61 affixed so as to project from the outside to the inside of the bell jar 10, a first charging nozzle 63 at the right side of the figure, and a second charging nozzle 65 at the left side of the figure. These nozzles 63 and 65 function as ion ejectors.

The burner 61, the first charging nozzle 63, and the second charging nozzle 65 are aligned at the same side wall of the bell jar 10. In the burner 61 is fitted an electrode wire 62, to which electrode wire 62 is connected a positive polarity DC power source 71. The first charging electrode 72 has an electrode wire 64 fitted inside it, to which electrode wire 64 is connected a first negative polarity DC power source 72. The second charging nozzle 65 has an electrode wire 66 fitted inside it, to which electrode wire 66 is connected a second negative polarity DC power source 73.

In the bell jar 10, the seed rod 1, which is axially supported by the chucks 56 and 57 affixed to the front ends of the shafts 54 and 55 rotating at the two sides, and the soot body 1A formed on the top surface of the seed rod 1 are made to rotate in the direction of the arrow R by the shafts 54 and 55 and are moved so as to traverse in the direction A or B perpendicular with the direction of rotation. FIG. 23, due to illustrative reasons, does not show the mechanism (lathe) for making the shafts 54 and 55 traverse while rotating in the above manner.

The burner 61, the first charging nozzle 63, and the second charging nozzle 65 are placed in a bell jar 10 so as to intersect with the seed rod 1 and soot body 1A which are rotated and made to traverse.

Oxygen, hydrogen, $SiCl_4$, and other feedstock gas flow along the electrode wire 62 in the burner 61. The $SiCl_4$ in the oxygen-hydrogen flame 41 synthesized in the bell jar 10 by the feedstock gas is hydrolyzed to synthesize $SiO_2$ particulates. The particulates are formed as the soot body 1A around the seed rod 1. Further, soot is deposited on the soot body 1A formed around the seed rod 1 to grow the soot body 1A.

As mentioned above, the soot body 1A rotates in the rotational direction R along with a traverse motion in the left and right directions A and B.

The soot body 1A is synthesized inside the bell jar 10 and glass ($SiO_2$) particulates etc. not contributing to the synthesis of the soot body 1A and not depositing on the soot body 1A are exhausted from the hood 60. The waste product is processed by a scrubber.

The electrode wire 62 inserted into the burner 61 is charged to a positive polarity high voltage by the positive polarity DC power source 71, so there is a corona discharge due to the high voltage charge and the feedstock gas introduced into the burner 61 is charged to a positive polarity and glass particulates charged to a positive polarity are ejected from the front end of the burner 61.

On the other hand, since the electrode wire 64 and the electrode wire 66 charged with a negative polarity by the first negative polarity DC power source 72 and the second negative polarity DC power source 73 are inserted in the first charging nozzle 63 and the second charging nozzle 65, the inert gas flowing along the electrode wires 64 and 66 in the charging nozzles 63 and 65, for example, argon gas or $N_2$ gas, is ejected as negative ions 43 and 44, which negative polarity negative ions 43 and 44 cause the soot body 1A to be charged to a negative polarity.

In this way, since the soot body 1A is charged to a negative polarity and the positively charged glass particulates are sent from the burner 61, the effect of deposition of the glass particulates on the soot body 1A by the static electricity in addition to the deposition due to the ejection force becomes higher.

So that the flow of the oxygen-hydrogen flame 41 ejected from the burner 61 is not disturbed by the flow of negative ions 43 or negative ions 44 ejected from the first charging nozzle 63 or the second charging nozzle 65, the charging nozzles 63 and 65 are placed at a predetermined distance away from the burner 61.

When the soot body 1A moves in the left direction B, the right side first charging nozzle 63 provided at a position ahead of the burner 61 in the direction of movement B is used to spray negative ions 43 on the soot body 1A, then glass particulates sprayed from the burner 61 are made to adhere to the soot body 1A.

On the other hand, when the soot body 1A moves in the right direction A the left side second charging nozzle 65 is used to eject negative ions 44 on the soot body 1A and cause glass particulates sprayed from the burner 61 to deposit on the soot body 1A.

In this way, in the apparatus for deposition of optical fiber glass particulates of this embodiment, a gas control apparatus (not shown) for controlling the opening or closing of a gas valve (not shown) for leading gas from an argon gas container to the gas channel of the first charging nozzle 63 or the second charging nozzle 65 controls the opening and closing of the gas value in tandem with the mechanism for causing the soot body 1A to traverse and thereby introduces argon gas from the argon gas container selectively to the first charging nozzle 63 or the second charging nozzle 65.

In this way, since the first charging nozzle 63 and the second charging nozzle 65 operate alternately, it is possible to make common use of the first negative polarity DC power source 72 and the second negative polarity DC power source 73. That is, it is possible to eliminate the second negative polarity DC power source 73 and supply power to the electrode wire 66 from the first negative polarity DC power source 72.

Table 1 shows the specific conditions for operation of the apparatus for deposition of glass particulates.

TABLE 1

| Burner conditions (feedstock gas) | |
|---|---|
| $SiO_2$: | 20 g/min |
| $H_2$: | 80 l/min |
| $O_2$: | 30 l/min |
| Voltage of positive electrode in burner: | +20 to 30 kV |
| Voltage of negative electrode inside charging nozzle: | −10 to 20 kV |
| Soot body | |
| Speed of traverse: | 40 cm/min |
| Rotational speed: | 250 rpm |

Figure 24:
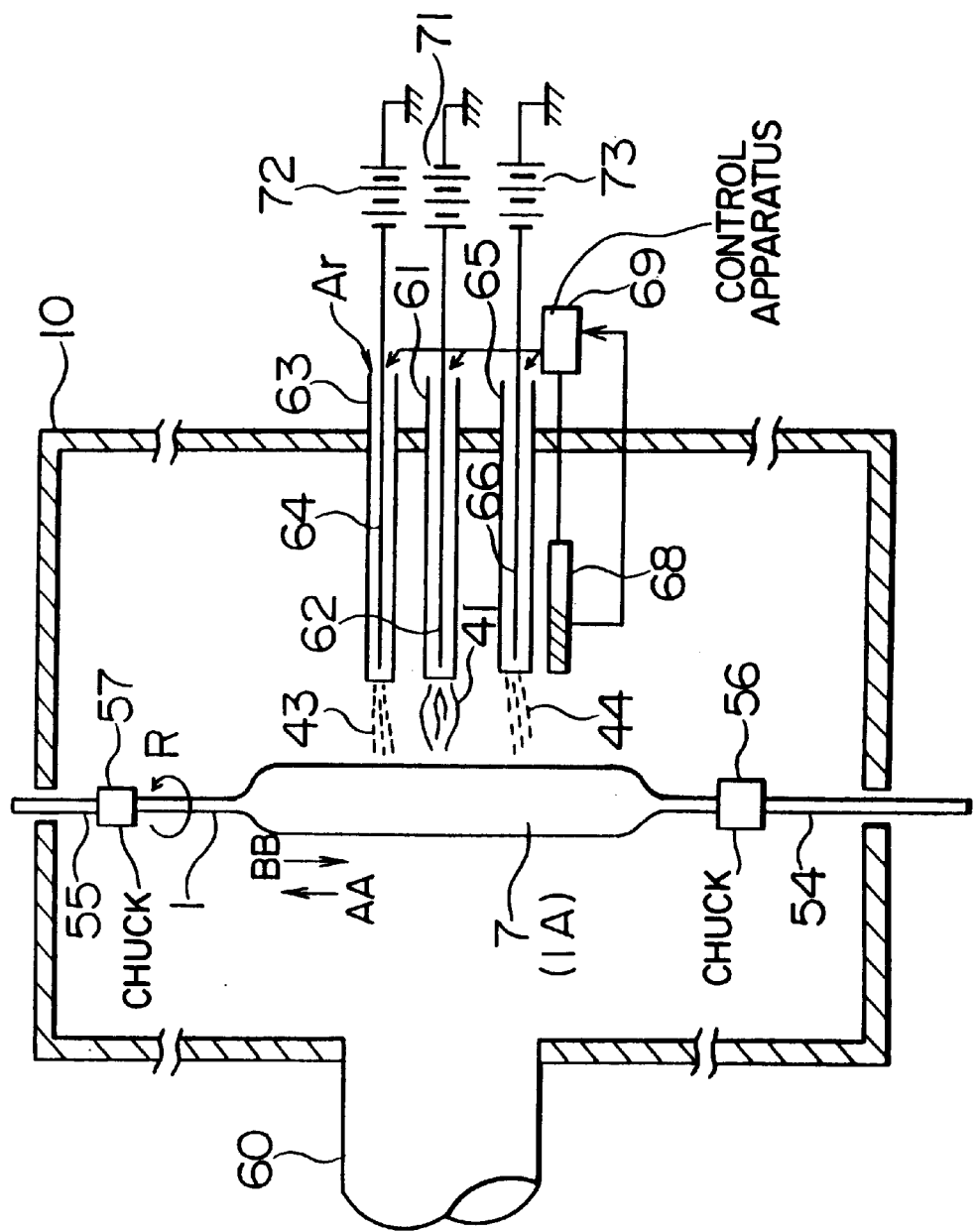
FIG. 24 is a constituent view of a modification of the fourth embodiment of an apparatus for production of an optical fiber preform of the present invention.

FIG. 24 is a view showing the construction of another apparatus for producing the optical fiber preform as a fourth embodiment of the present invention.

The production apparatus shown in FIG. 24 differs from the construction in the apparatus for deposition of particulates shown in FIG. 23, wherein the soot body 1A was traversed in the horizontal direction, in that it is constructed to traverse in the vertical direction.

The selective driving of the first charging nozzle 63 and the second charging nozzle 65 in the apparatus means that, in the same way as above, when the soot body 1A is moved in the downward direction BB, negatively charged argon gas is ejected from the first charging nozzle 63 leading the burner 61 and that glass particulates charged to a positive polarity from the burner 61 are ejected from the burner 61 to the surface of the soot body 1A, which is negatively charged by the argon gas.

When the soot body 1A is moved in the upward direction AA, the second charging nozzle 65 and the burner 61 are driven in the same way as above.

Preferably, a surface potential measurement element 68 is provided near the soot body 1A inside the bell jar 10, the output signal of the same is input to a surface potential control apparatus 69 provided at the outside of the bell jar 10, and a surface potential control apparatus 69 controls the amount of ions of argon gas output from the first charging nozzle 63 or the second charging nozzle 65 in accordance with the surface potential detected by the surface potential measurement element 68. By this control of the amount of ions, it is possible to stabilize the efficiency of deposition of the glass particulates on the soot body 1A.

Figure 25:
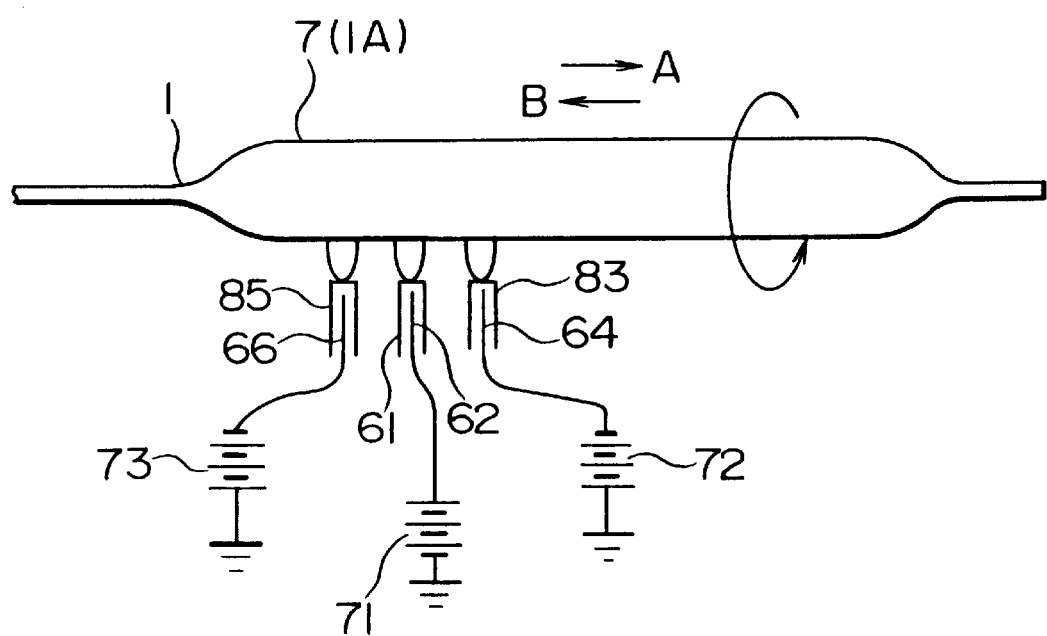
FIG. 25 is a constituent view of another modification of the fourth embodiment of an apparatus for production of an optical fiber preform of the present invention.

FIG. 25 is a view showing another construction of the apparatus for production of an optical fiber preform of the fourth embodiment of the present invention. In FIG. 25, the bell jar 10, the hood 60, the shafts 54 and 55, and the chucks 56 and 57 illustrated in FIG. 23 and FIG. 24 are omitted.

This embodiment shows a modification of the apparatus for deposition of particulates shown in FIG. 23. Instead of the first charging nozzle 63 shown in FIG. 23, use is made of the first burner 83 in which an electrode wire 64 connected to a first negative polarity DC power source 72 is inserted and instead of the second charging nozzle 65 shown in FIG. 23, use is made of a second burner 85 in which an electrode wire 66 connected to a second negative polarity DC power source 73 is inserted.

That is, the first charging nozzle 63 and the second charging nozzle 65 in the apparatus for deposition of glass particulates shown in FIG. 23 are replaced by a first burner 83 and a second burner 85.

The basic operation is the same as the operation explained with reference to FIG. 23, but the amounts of oxygen, hydrogen, and $SiCl_4$ flowing to the burner 61 differ from the above values.

The charging polarities in the above-mentioned fourth embodiment may be reversed. For example, the electrode wire 62 in the burner 61 shown in FIG. 25 may be made a negative polarity and the electrode wire 64 in the first charging nozzle 63 and the electrode wire 66 in the second charging nozzle 65 may be made a positive polarity. In summary, it is sufficient that the argon gas and the glass particulates attract each other by static electricity. It is enough that the polarities of the electrode wire 62 and the electrode wire 64 or electrode wire 66 be opposite.

The relationship of rotation and traverse motion of the soot body 1A, burner 61, first charging nozzle 63, and second charging nozzle 65 need only be such that the soot body 1A, the burner 61, etc. traverse relative to each other. As opposed to the above-mentioned relationship of movement, the soot body 1A alone may be made to rotate and the burner 61 side made to traverse.

Further, it is also possible to apply the surface potential measurement element 68 and the surface potential control apparatus 69 illustrated in FIG. 24 to the apparatus for production of an optical fiber preform shown in FIG. 23 and FIG. 25.

Further, in the above embodiments, inert gas was passed along the electrode wire in the charging nozzles, but oxygen and hydrogen gas may also be passed and burned. This is preferable, since if this is done, then the soot body can be heat treated to a desired hardness.

Comparative Example 1

A comparison will now be made of the results of deposition of particulates by a process of production based on the VAD method (for example, Japanese Unexamined Published Patent Application No. 58-217447) and the results of deposition of glass particulates based on the embodiment of the present invention using the OVD method.

TABLE 2

| | Examples of embodiment | Conventional process |
|---|---|---|
| Movement mechanism | Traverse motion (OVD) | Simple lifting (VAD) |
| Deposition speed | 10 to 30 g/min | 1 to 3 g/min |
| Feedstock feed | | |
| $H_2$ | 100 l/min | Approx. 10 l/min |
| $SiCl_4$ | 100 to 200 g/min | Approx. 2 to 5 g/min |
| Rotational speed | 150 to 200 rpm | 10 to 20 rpm |

In the VAD method, if the deposition speed is made faster, there is a detrimental effect on the formation of the core portion under the soot body. Therefore, in the VAD method, the deposition speed can only be made about 1 to 3 g/min. According to this embodiment of the present invention based on the OVD method, the amount of supply of the feedstock gas, the amount of the flame, the strength of the soot body, and the deposition speed are all improved compared with the results of deposition of glass particulates by the conventional process.

Comparative Example 2

According to this method of optimizing the deposition yield of the glass particulates using the surface potential control apparatus 69 of the present invention, the time can be shortened about 40 percent compared with the conventional deposition speed and as a result an improvement is seen in the deposition yield of glass particulates.

Figure 26:
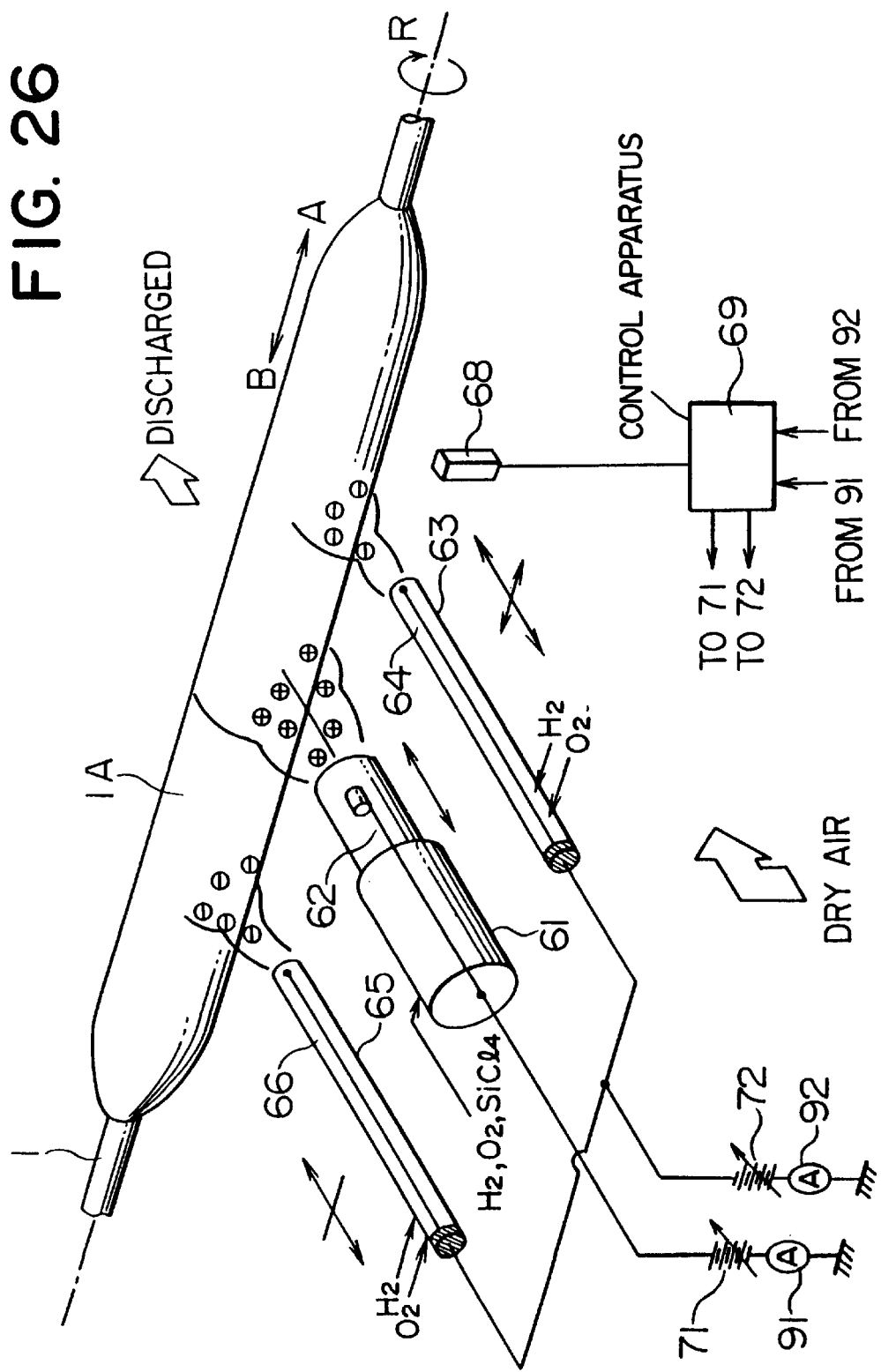
FIG. 26 is a constituent view of still another modification of the fourth embodiment of an apparatus for production of an optical fiber preform of the present invention.

Another modification of the fourth embodiment is illustrated in FIG. 26.

In this apparatus for production of an optical fiber preform, the seed rod 1 is placed in parallel to the horizontal direction, is made to traverse along the horizontal direction, and is rotated in the direction perpendicular to the traverse direction. A soot body 1A is deposited on the soot body 1A. Three burners 65, 61, and 63 are aligned in the direction perpendicular to the traverse direction of the seed rod 1.

In the center burner 61, an electrode 62 connected to a positive polarity DC high voltage power source 71 is inserted. An electrode 64 is inserted into the burner 63, and an electrode 66 is inserted into the burner 65. A negative polarity DC high voltage power source 62 is connected to the electrodes 64 and 66. The positive polarity DC high voltage power source 71 is provided via the ammeter 91, and the negative polarity DC high voltage power source 72 is provided via the ammeter 92. $O_2$ gas, $H_2$ gas, and $SiCl_4$ are introduced to the center burner 61. Glass ($SiO_2$) particulates charged to a positive polarity by the electrode 62 are deposited on a seed rod 1 or the soot body 1A deposited on the same. The burner 63 or the burner 65 at the position ahead of the ejection of glass particulates from the burner 61 is selectively driven according to the traverse direction of the seed rod 1. $O_2$ gas and $H_2$ gas are introduced to the burner 63 or 65 and are charged to a negative polarity by the electrode 64 or 66. The oxygen-hydrogen gas charged to a negative polarity by the mixture of the $O_2$ gas and the $H_2$ gas is ejected from the burner 61 and charges to a negative polarity the seed rod 1 or the soot body 1A ahead of the glass particulates charged to a positive polarity, thereby improving the rate of deposition of the positive polarity glass particulates on the soot body 1A.

Further, the surface potential measurement sensor 68 and its control apparatus 69 are provided. The control apparatus 69 inputs the readings of the surface potential measurement sensor 68 and the ammeters 91 and 92 and, as mentioned above, controls the voltage of the positive polarity DC high voltage power source 71 or the negative polarity DC high voltage power source 72 in accordance with the surface potential of the soot body 1A.

According to the fourth embodiment of the present invention, the speed by which the particulates are synthesized on the seed rod to form the soot body can be tremendously increased.

Further, according to the fourth embodiment of the present invention, the efficiency of deposition of the glass particulates on the soot body is strikingly improved, so it is possible to make effective use of resources and to tremendously reduce the cost of production of the soot body and, in turn, the cost of production of an optical fiber.

Further, according to the fourth embodiment of the present invention, the amount of waste product not depositing on the soot body and being discharged from the hood is decreased too, so the cost of treating the waste can be tremendously reduced as well.

Fifth Embodiment

A fifth embodiment of the present invention will now be described.

The fifth embodiment has as its object the improvement of the amount of deposition or a deposition per unit time of the glass ($SiO_2$) particulates at the two ends of the target in the OVD method.

In the OVD method, the target, comprised of the seed rod and the optical fiber porous preform synthesized on the same, is rotated about its support axis, and the target and the burner from which the glass particulates are ejected engage in relative motion. That is, the target is traversed in the horizontal direction left and right with respect to the burner. At the turnaround positions of the traverse motion, that is, the ends of the target, the amount of deposition at portions far from the center of the flame from the burner is small, so the amount of deposition of the optical fiber porous preform falls and the outer diameter of the two ends become smaller than the center portion. That is, the diameter becomes gradually smaller compared with the outer diameter of the center portion of the optical fiber porous preform as it goes toward the ends. The portion at the ends where the outer diameter becomes small cannot be used as a product because the outer diameter of the cladding is smaller than the core diameter and thus constitutes loss. Usually, about 80 percent of the entire portion where the glass particulates are deposited can be used as a product. That is, there is a waste of about 20 percent.

To reduce the cost of production of the final optical fiber, it is desirable to minimize the loss portion as much as possible. The fifth embodiment has as its object the improvement of the synthesis at the ends of the optical fiber porous preform.

Figure 27:
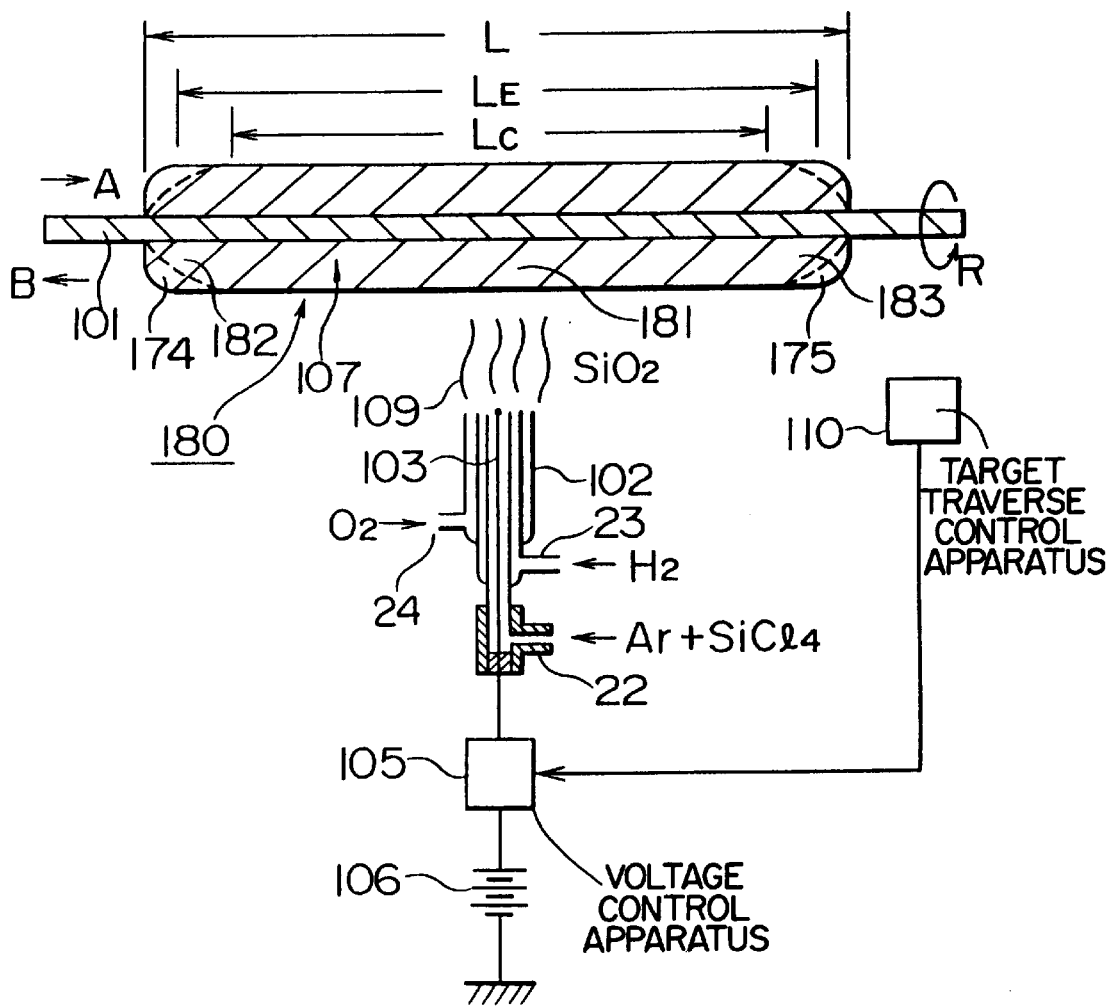
FIG. 27 is a constituent view of a fifth embodiment of the apparatus for production of an optical fiber preform of the present invention.

FIG. 27 is a view showing the construction of an apparatus for working the process for synthesis of an optical fiber porous preform in the fifth embodiment of the present invention.

In the apparatus for synthesis of an optical fiber porous preform shown in FIG. 27, in the chamber, glass particulates 109 from the burner 102 are blown on the target 180 to synthesize an optical fiber porous preform (soot body) 107 on the core rod (seed rod) 101.

The core rod 101 is axially supported by shafts (not shown) at its two ends and is rotated in the rotational direction R and made to traverse in the direction A or the direction B with respect to the burner 102 by a drive mechanism, not shown, driven by a target traverse control apparatus 110 through a chuck (not shown). That is, the target 180 and the burner 102 are made to engage in relative motion.

Argon gas and $SiCl_4$ gas are introduced to the innermost portion of the burner 102, $H_2$ gas is introduced to the outside of this, $O_2$ gas is introduced to the outermost circumference, and glass particulates 109 are ejected from the front end of the burner 102.

An electrode 103 is inserted in the burner 102. The electrode 103 is connected to a high voltage power source 106 through a voltage control apparatus 105. The voltage control apparatus 105 receives as input the traverse turnaround control signal of the target traverse control apparatus 110 and changes the voltage of the high voltage power source 106 applied to the electrode 103.

Further, if the core rod 101 and the soot body 107 are charged to a negative polarity, the glass particulates 109 are charged to a positive polarity, whereby it becomes possible to promote the deposition on the soot body 107 of the glass particulates 109 to be deposited on the soot body 107.

Regarding the direction of motion of the target 180, if a predetermined voltage is applied to the electrode 103 and the glass particulates are charged to the predetermined polarities and ejected to the target 180 through the burner 102, then as mentioned above, the rate of deposition of the glass particulates 109 on the soot body 107 at the two ends 182 and 183 of the target 180 falls, whereby the outer diameter of the target 180 at the two ends 182 and 183 of the target 180 becomes gradually smaller compared with the outer diameter at the center portion 181 of the target 180.

As a result, the two ends 182 and 183 of the target 180 cannot be used for the final product, i.e., only the center portion 181 not including the two ends 182 and 183 can be utilized for the final product. The length $L_C$ of the center portion 181, as mentioned above, is about 80 percent of the total length L of the target 180.

To resolve this problem, the timing before and after the turnaround operation in the traverse motion of the soot body 107 by the target traverse motion control apparatus 110 is notified to the voltage control apparatus 105 from the target traverse motion control apparatus 110. The voltage control apparatus 105, as shown in FIG. 28, raises the voltage applied from the high voltage power source 106 applied to the electrode 103 when causing deposition of glass particulates 109 at the ends 182 and 183 of the target 180 from the voltage applied when causing glass particulates 109 to deposit on the center portion 181 of the target 180 and thus increases the amount of the glass particulates 109 depositing at the two ends 182 and 183 of the target 180.

Figure 28:
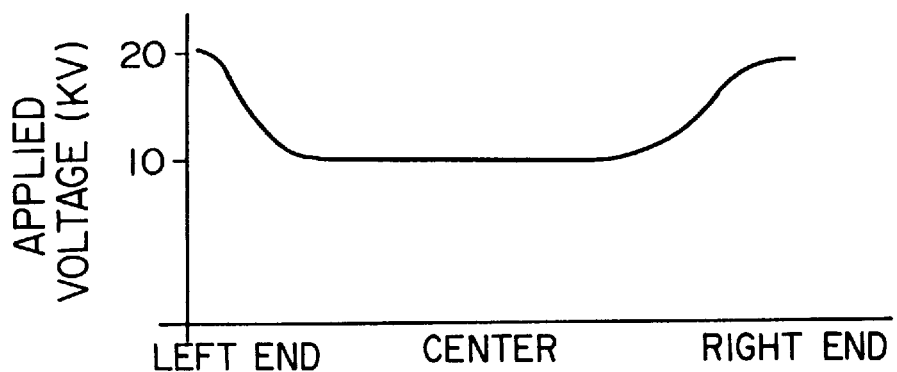
FIG. 28 is a graph of the relationship between the position in the target and the applied voltage in a fifth embodiment of the process for production of an optical fiber preform of the present invention.

FIG. 28 shows the position of the target 180 on the horizontal axis and shows the voltage applied to the electrode 103 through the voltage control apparatus 105 on the vertical axis.

As a result, soot bodies 174 and 175 of the same outer diameter as the outer diameter of the center portion 181 are synthesized at the two ends 182 and 183 of the target 180. The portions of the soot bodies 174 and 175 deposited at the two ends 182 and 183 of the target 180 may be used for the final product, so the length of the portion able to be effectively utilized for the final product increases from the above-mentioned length $L_C$ to the length $L_E$.

Below, first and second experiments of the fifth embodiment will be explained.

Experiment 1

(Conditions)

Target 180

Rotational speed: Approximately 300 rpm

Traverse speed: 500 mm/min (target 180 is traversed right and left with respect to the burner 102)

Core rod 101

Outer diameter: 20 mm

Length: 1 m

Burner 102: Multipipe construction able to introduce Oxygen 30 SLM (standard ls-minute)

Hydrogen: 80 SLM

Argon: 20 SLM $SiCl_4$ gas: 10 SLM

Electrode 103: Tungsten electrode of 1.6 mm outer diameter inserted into center section of burner up to position 3 mm inside from front end of burner Applied voltage (FIG. 28)

Center 181 of target 180: 10 kV

Two ends 182, 183 of target 180: 20 kV

Under the above conditions, glass particulates were made to deposit to an outer diameter of 150 mm.

Figure 29:
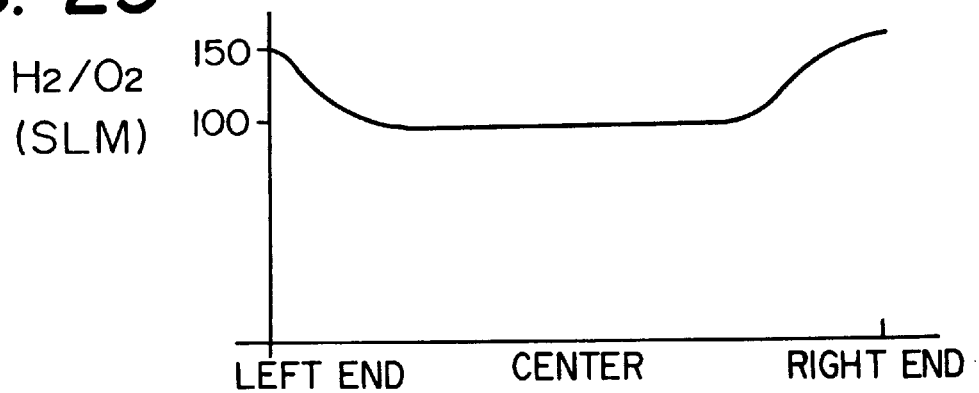
FIG. 29 is a graph of the relationship between the position of the target and the amounts of application of hydrogen and oxygen in the fifth embodiment of a process of production of an optical fiber preform of the present invention.

FIG. 29 is a graph showing the changes in the amount of the $H_2/O_2$ in the voltage applied to the electrode 103 shown in FIG. 28 from 10 kV to 20 kV. The amount of the two ends 182 and 183 increases about 50 percent from the center portion 181 of the target 180.

Figure 30:
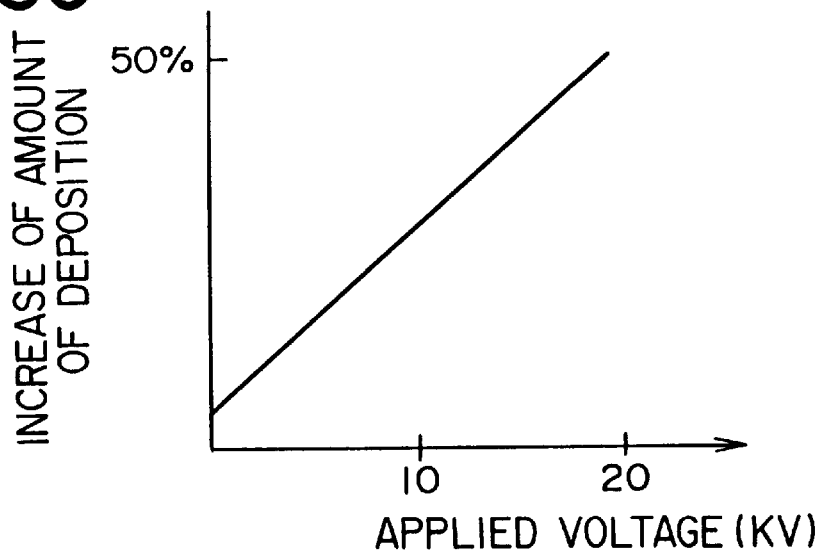
FIG. 30 is a graph of the relationship between the applied voltage and the amount of deposition of glass particulates in the fifth embodiment of the process for production of an optical fiber preform of the present invention.

FIG. 30 is a graph showing the voltage applied to the electrode 103 and the amount of increase of the glass particulates depositing on the target 180. The rate of increase of the amount of deposition means the value obtained by dividing the amount of deposition in the case when voltage is applied by the amount of deposition in the case where no voltage is applied, with the conditions of the gas introduced to the burner 102 made exactly the same.

By enlarging the voltage applied to the electrode 103, it is learned, the rate of increase of the amount of deposition of the glass particulates 109 depositing on the target 180 increases.

As a result, it is possible to make the outer diameter of the center portion 181 of the target 180 and the outer diameter of the two ends 182 and 183 about the same.

As shown in FIG. 28, near the turnaround points of the traverse motion of the target 180, the voltage applied to the electrode 103 in the burner 102 is increased from the +10 kV voltage applied when blowing glass particulates 109 on the center portion 181 of the target 180 to +20 kV voltage when blowing glass particulates 109 on the ends 182 and 183 of the target 180. If the amount of deposition increases when the burner gas conditions are made constant, the density of the glass particulates 109 which deposit falls from that of the center portion, so for heat treatment, as shown in FIG. 29, the amounts of the oxygen and hydrogen gases are increased from 100 to 150 SLM. As a result, it is possible to obtain the shape shown in FIG. 27 as the target 180 and the portion which can be used for the final product is increased to 97 percent, shown as the length $L_E$, as compared with the overall length L where the glass particulates 109 are deposited.

Note that the same effect of increasing the amount of deposition can be exhibited by charging the target to a negative polarity and lowering the surface potential of the target 180 at the ends 182 and 182 of the target 180 instead of raising the charging voltage of the glass particulates 109 by applying a high positive polarity voltage to the electrode 103.

Further, the polarity of the voltage applied to the core rod 101 may be made the positive polarity and the polarity for charging the glass particulates 109 may be made the negative polarity.

A second apparatus for working the process of synthesis of the optical fiber porous preform of the fifth embodiment of the present invention will be explained next.

Figure 31:
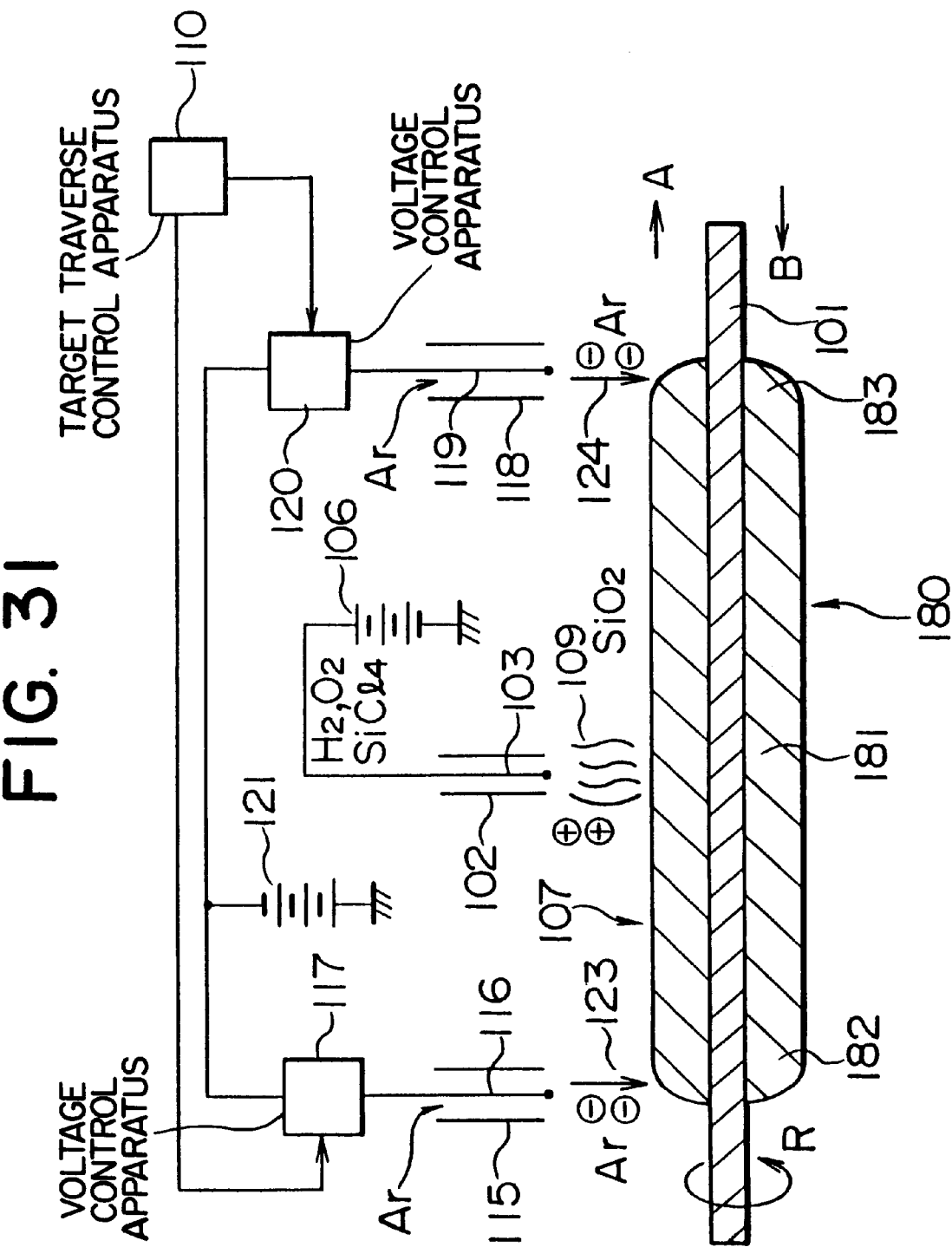
FIG. 31 is a constituent view of a modification of the fifth embodiment of an apparatus for production of an optical fiber preform of the present invention.

FIG. 31 is a constitutional view of a second apparatus for synthesizing an optical fiber porous preform. The apparatus for synthesis of an optical fiber porous preform fixes the charging polarity of the glass particulates 109 ejected from the burner 102 to the positive polarity and blows negative polarity ions, for example, argon gas ions, on the soot body 107 to charge the surface of the target 180 to a negative polarity. The soot body 107 is rotated and made to traverse with respect to the burner 102 in the same way as the example shown in FIG. 27.

The apparatus for synthesis of an optical fiber porous preform is provided with two charging nozzles 115 and 118 at the left and right of the soot body for charging the soot body 107 to a negative polarity before blowing the glass particulates 109 ejected from the burner 102 to the soot body 107 in the traverse motion of the soot body 107.

These charging nozzles 115 and 118 have inserted in them electrodes 116 and 119. These electrodes 116 and 119 are connected through the voltage control apparatuses 117 and 120 to a negative polarity power source 121. The voltage control apparatuses 117 and 120, in the same way as the voltage control apparatus 105 shown in FIG. 27, receive as input timing signals of the switching of traverse motion from the target traverse motion control apparatus 110 and controls the voltage applied to the electrodes 116 and 119.

When the target 180 moves in the left direction B, argon gas charged to a negative polarity is ejected from the charging nozzle 118 ahead of the burner 102 to the target 180. When it moves in the right direction A, argon gas charged to a negative polarity is ejected from the charging nozzle 115 ahead of the burner 102 to the target 180. That is, the charging nozzle 115 and the charging nozzle 118 are alternately driven in synchronization with the traverse motion of the soot body 107.

Figure 32:
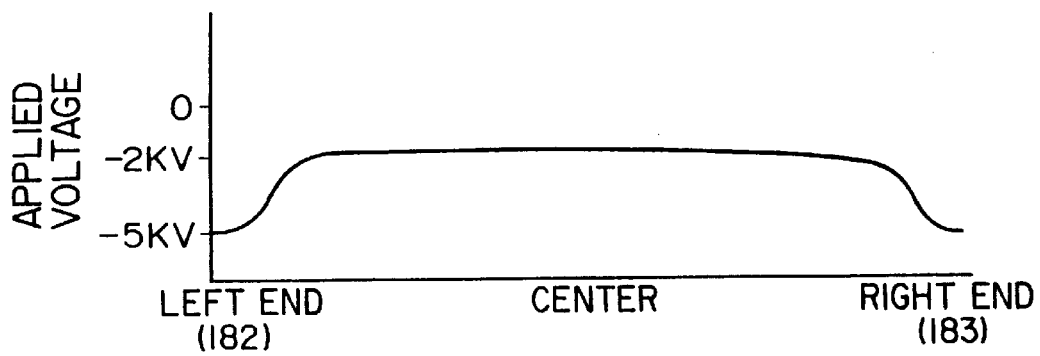
FIG. 32 is a graph of the relationship between the position in the target and the applied voltage in an embodiment of a process for production of an optical fiber preform of the present invention shown in FIG. 31.

Before the voltage control apparatus 117 or 120 receives as input the pre-switching signal and ending signal of the traverse motion of the target 180 from the target traverse motion control apparatus 110, as shown in FIG. 32, the voltage of the negative polarity power source 121 is controlled and applied to the electrode 116 or 119 so that argon gas 123 or 124 charged by an ordinary voltage is ejected to the center of the target 180.

When the pre-switching signal and ending signal of the traverse motion of the target 180 is input from the target traverse motion control apparatus 110, the voltage control apparatus 117 or 120, as shown in FIG. 32, controls and applies the voltage of the negative polarity power source 121 to the electrode 116 or 119 so that argon gas 123 or 124 charged by a voltage lower than the ordinary voltage is ejected to the two ends 182 and 183 of the target 180.

As a result, the potential difference between the potential at the two ends 182 and 183 of the target 180 and the glass particulates 109 becomes larger than the potential difference between the potential at the center portion 181 of the target 180 and the glass particulates 109 and the rate of deposition of glass particulates 109 at the two ends 182 and 183 of the target 180 becomes higher.

Experiment 2

Under the same gas conditions as in Experiment 1, the voltage applied to the electrode 103 in the burner 102 was made +10 kV and the voltage applied to the electrodes 116 and 119 in the charging nozzles 115 and 118 was changed to −5 kV at the ends 182 and 183 and to −2V at the center portion 181 as shown in FIG. 32.

As a result, in the same way as Experiment 1, it is possible to synthesize a soot body 107 to substantially the same outer diameter as the center portion even at the ends of the target 180 and therefore the portion which can be used for the final product is improved to 97 percent of the overall length on which the glass particulates are deposited.

As explained above, if the potential difference between the target 180 and the glass particulates 109 at the ends of the target 180 is made larger than the potential difference at the center portion of the target 180, as mentioned above, it is possible to synthesize a soot body 107 with the same outer diameter as the center portion even at the ends of the soot body 107, as mentioned above.

Therefore, as the apparatus for working the process of synthesis of an optical fiber porous preform of the fifth embodiment of the present invention, the first apparatus for synthesis of an optical fiber porous preform explained with reference to FIG. 27 and the second apparatus for synthesis of an optical fiber porous preform explained with reference to FIG. 31 may be combined.

As mentioned above, in the fifth embodiment of the present invention, it is possible to accurately control the amount of deposition of the glass particulates by the effect of the static electricity between the target and the glass particulates, suppress the reduction in the outer diameter of the soot body near the turnaround points of the traverse motion, and remarkably increase the portion which can be utilized for the final product, so the efficiency of production can be remarkably improved.

Sixth Embodiment

Next, a sixth embodiment of the present invention will be explained.

The sixth embodiment relates to a process and apparatus for the production of an optical fiber preform which further improves the rate of deposition of the glass ($SiO_2$) particulates on the soot body.

When glass particulates charged to the same polarity are continuously made to deposit on a target, the charge builds up on the target and the potential of the same repels the glass particulates which are to be later deposited, conversely reduce the deposition efficiency and, further, causing cracks. As a method for resolving this problem, the practice is to lower the surface potential of the target by blowing charge-clearing ions on the target before the deposition of the glass particulates. However, blowing such ions on the target disturbs the shape of the flame from the burner and ends up changing the conditions of synthesis of the optical fiber porous preform. If an attempt is made to deal with this problem, the apparatus for synthesis of the optical fiber porous preform becomes complicated and, as a result, the cost of the optical fiber porous preform produced using this apparatus for synthesis of an optical fiber porous preform soars and in turn the cost of the optical fiber soars.

The sixth embodiment of the present invention has as its object the provision of a process and apparatus for synthesis of an optical fiber porous preform which resolves the above-mentioned problem and further improves the efficiency of deposition of the glass particulates on the target.

Figure 33:
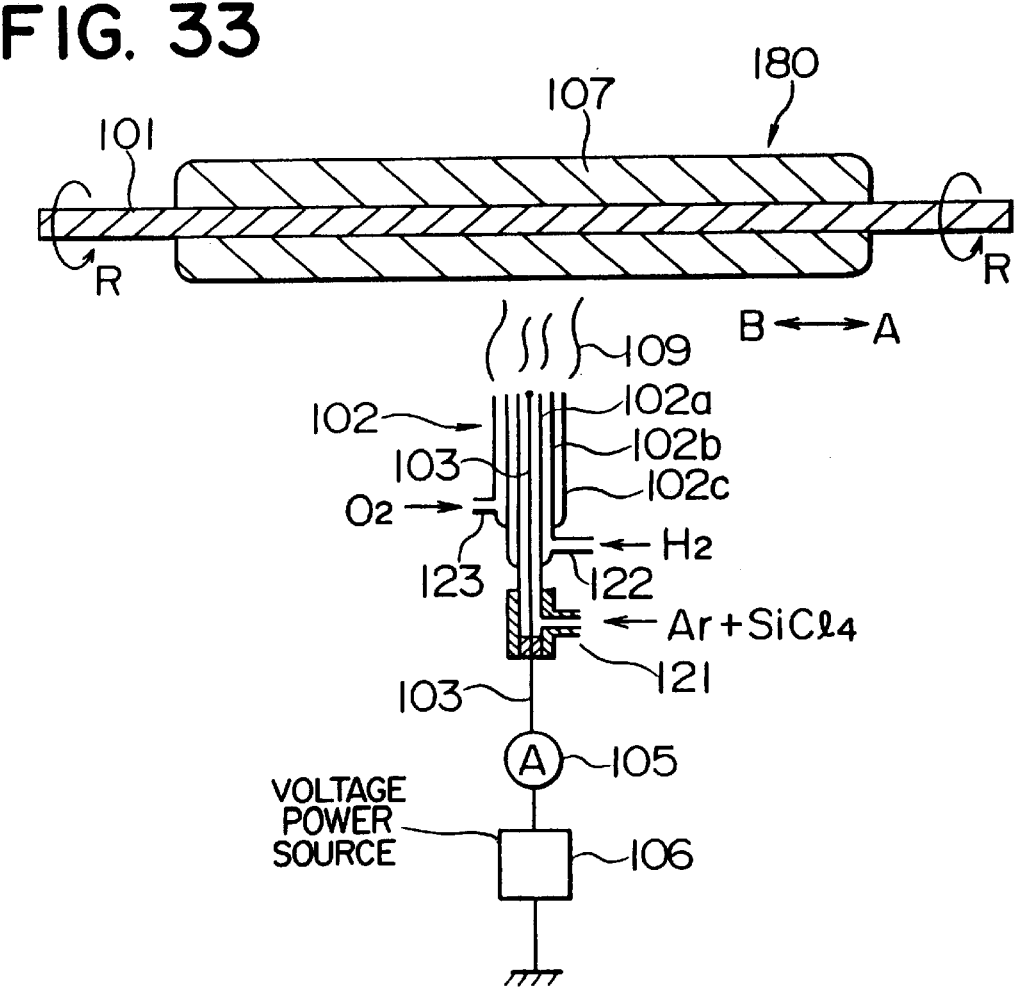
FIG. 33 is a constituent view of a sixth embodiment of an optical fiber preform of the present invention.

FIG. 33 is a view showing an example of the construction of an apparatus for synthesis of an optical fiber porous preform for working the process for synthesis of an optical fiber porous preform according to the sixth embodiment of the present invention.

The apparatus for synthesis of an optical fiber porous preform synthesizes the porous glass preform 180 by causing glass particulates 170 to deposit on a core rod 101 affixed to shafts, not shown.

Therefore, the shafts (not shown) which axially support the core rod 101 are made to traverse in the left and right directions A and B while being rotated in the rotational direction R by a drive mechanism, not shown. Flame 109 is ejected from the fixed oxygen-hydrogen burner 102 to the core rod 101 as it rotates and traverses. New glass particulates 107 are deposited and accumulate on core rod 101 and the glass particulates 107 built up on the core rod 101.

The burner 102, in this example, has a four-pipe structure. Argon gas and $SiCl_4$ are introduced into a port 121 leading to the burner inner pipe 102a. Hydrogen gas ($H_2$) is introduced into a port 122 leading to the burner intermediate pipe 102b. Oxygen gas ($O_2$) is introduced to a port 123 leading to the burner outer pipe 102c. Hydrolysis occurs in the oxygen-hydrogen flame and glass particulates forming the cladding of the optical fiber are ejected in the flame 109.

Further, the electrode wire 103 is inserted into the burner 102 and a high voltage power source 106 is connected to the electrode wire 103 through an ammeter 105.

Referring to FIG. 33, an explanation will be made of an embodiment of the cladding by the OVD method.

The shafts axially supporting the core rod 101 are rotated at a rotational speed of about 300 rpm and made to traverse to the left and right at a speed of 500 mm/min. A core rod 101 having an outer diameter of 20 m and a length of 1 m is affixed to the shafts. Glass ($SiO_2$) particulates are made to deposit on the outer circumference of the core rod 101 to an outer diameter of about 150 mm.

As a first experiment of the sixth embodiment, 30 SLM of oxygen gas, 80 SLM of hydrogen gas, 20 SLM of argon gas, and 10 SLM of $SiCl_4$ gas were introduced to the burner 102. In this experiment, a tungsten electrode 103 with an outer diameter of 1.6 mm was inserted into the center portion of the burner 102 to a distance 3 mm from the front end of the burner 102.

Figure 34:
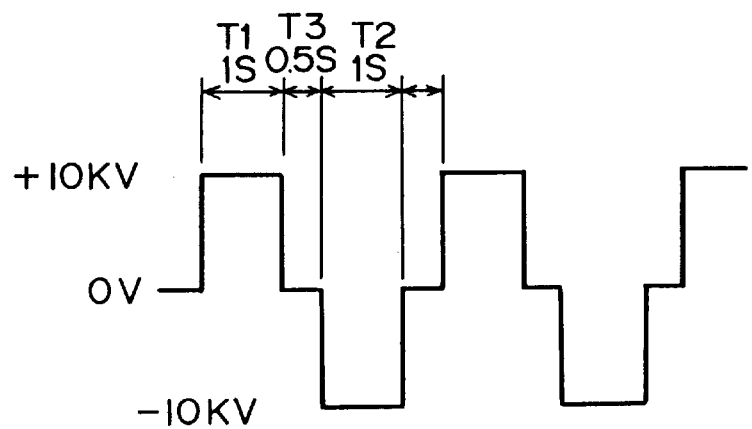
FIG. 34 is a graph of the applied voltage characteristics in the apparatus for production of an optical fiber preform shown in FIG. 33.

A voltage of the waveform shown in FIG. 34 was applied to the electrode wire 103 from the DC high voltage power source 106.

Figure 35:
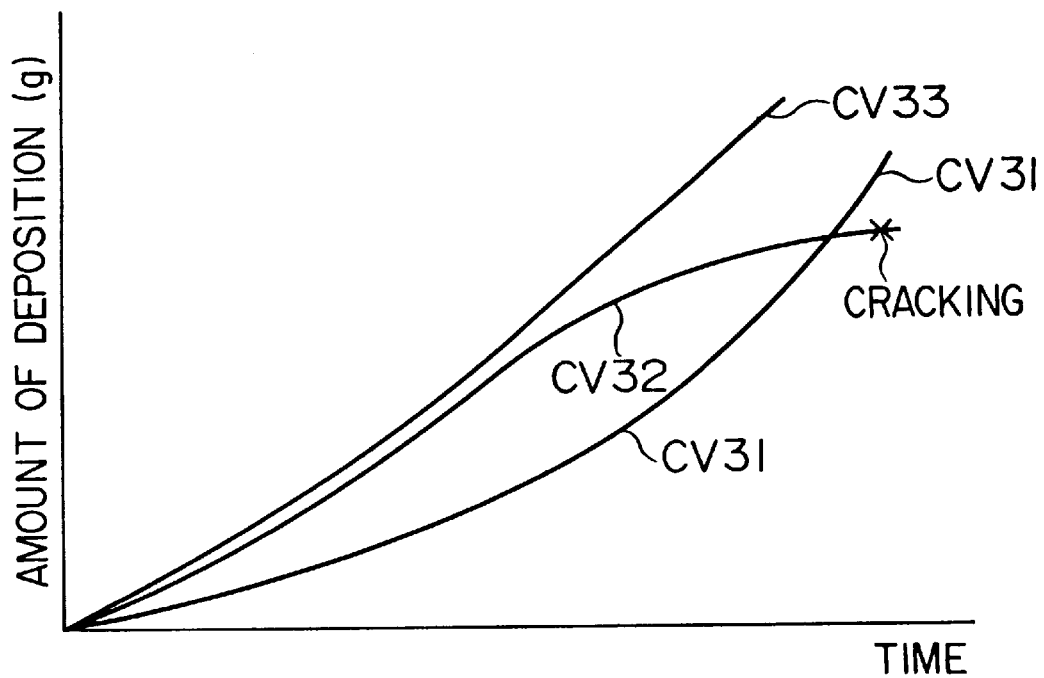
FIG. 35 is a graph of the relationship between the elapse of time and the amount of deposition of glass particulates in a sixth embodiment of the process of production of an optical fiber preform of the present invention.

FIG. 35 is a graph showing the increase of the amount of deposition of glass particulates to the target according to the above experiment.

In the figure, the curve CV31 is a curve of the increase of the amount of deposition of the glass particulates 107 on the target in the case when no voltage at all was applied to the electrode wire 103 from the DC high voltage power source 106 under the above conditions of the feedstock gas and combustion gas introduced to the burner 102.

The curve CV32 shows the amount of deposition of the glass particulates 107 to the target in the case of application of a positive polarity DC voltage of +10 kV to the electrode wire 103 in the burner 102. In this case, the deposition speed of the glass particulates 107 was improved from the amount of deposition shown by the curve CV31 by the application of the high voltage to the electrode wire 103, but as the amount of the charge of the target increased, the deposition speed gradually fell and finally cracks occurred.

The curve CV33 is the curve of the increase of the amount of deposition of glass particulates 107 according to the present experiment. In this example, as shown in FIG. 34, positive polarity and negative polarity DC voltages of ±10 kV were applied to the electrode wire 103 in the burner 102 from the DC high voltage power source 106 at a time T1 of 1 second and a time T2 of 1 second, with a time T3 of 0.5 second of 0V in between, for a continuous 3 second cycle. In this case, no decline was seen in the deposition speed of the glass particulates 107 and the amount of deposition increased about two-fold from the case of the curve CV31 showing the amount of deposition of the glass particulates 107 when not applying DC voltage to the electrode wire 103 over the entire period of synthesis.

The cycle of application of the DC voltage from the DC high voltage power source 106 to the electrode wire 103, the ratio of the times T1 and T2 of application of the positive polarity and negative polarity voltages, the length of the time T3 when the voltage is not applied, the amplitude of the positive polarity and negative polarity voltages, and other conditions according to the embodiment shown by the curve CV33 are meant to enable the charged particulates to deposit on the target without being neutralized in the space between the burner 102 and the target, so there are suitable values based on the conditions of the gas synthesized at the burner 102 and ejected as a flame 109. In the final analysis, it is desirable to make the surface potential of the target become near 0 kV.

If the cycle of application of the voltage from the DC high voltage power source 106 to the electrode wire 103 is too short, the particulates become neutral before reaching the target and therefore the effect of increasing the amount of deposition becomes smaller. Therefore, there is a lower limit commensurate with the rate of flow of the particulates ejected from the burner 102.

Further, in this embodiment, T3 was made 0.5 second, but substantially the same effect can be expected even if this is made 0.

Figure 36:
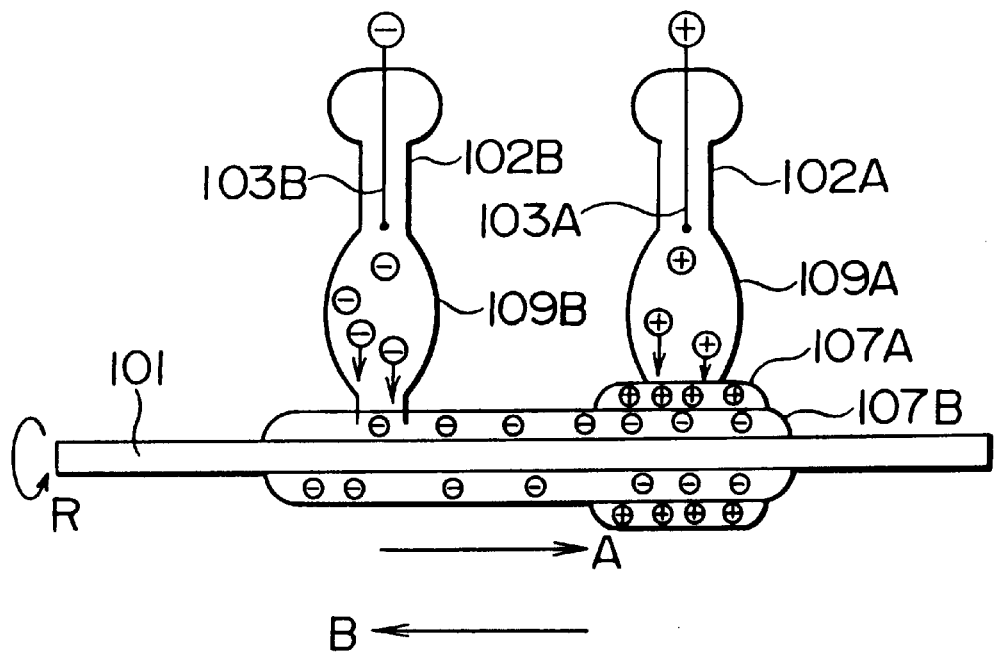
FIG. 36 is a constituent view of the sixth embodiment of an apparatus for production of an optical fiber preform of the present invention.

In a second experiment of the sixth embodiment, as shown in FIG. 36, use was made of two burners 102A and 102B.

The two burners 102A and 102B respectively had the electrode wires 103A and 103B inserted in them. These electrode wires 103A and 103B had a positive polarity voltage and negative polarity voltage applied to them from a DC high voltage power source 106. The polarities of the DC voltages applied to the electrode wires 103A and 103B were not made to change. Therefore, the charge of the flame 109A ejected from the burner 102A was a positive polarity, while the charge of the flame 109B ejected from the burner 102B was a negative polarity.

In the second experiment, the construction and conditions of the apparatus for synthesizing the optical fiber porous preform, outside of the above-mentioned burners 102A and 102B and the electrode wires 103A and 103B, were similar to those of the above-mentioned first experiment.

The core rod 101 was made to traverse while being rotated. When the core rod 101 moved in the direction A, negative polarity glass particulates 107B generated by the flame 109B ejected from the leading burner 102B first deposited on the target, then positive polarity glass particulates 107A generated by the flame 109A ejected from the burner 102A deposited and accumulated on the same. Conversely, when the core rod 101 moved in the direction B, the positive polarity glass particulates 107A generated by the flame 109A ejected from the leading burner 102A first deposited on the target, then the negative polarity glass particulates 107B generated by the flame 109B ejected from the burner 102B were deposited and accumulate on the same.

That is, glass particulates 107A and 107B in a state charged with alternately differing polarities due to the motion of core rod 101 deposited on the target. Since the charged polarities differed, the glass particulates 107A and 107B were efficiently deposited on the target by the force of attraction of the static electricity.

By adjusting the value of the voltage applied to the electrode wires 103A and 103B, the optimal deposition conditions can be obtained.

Figure 37:
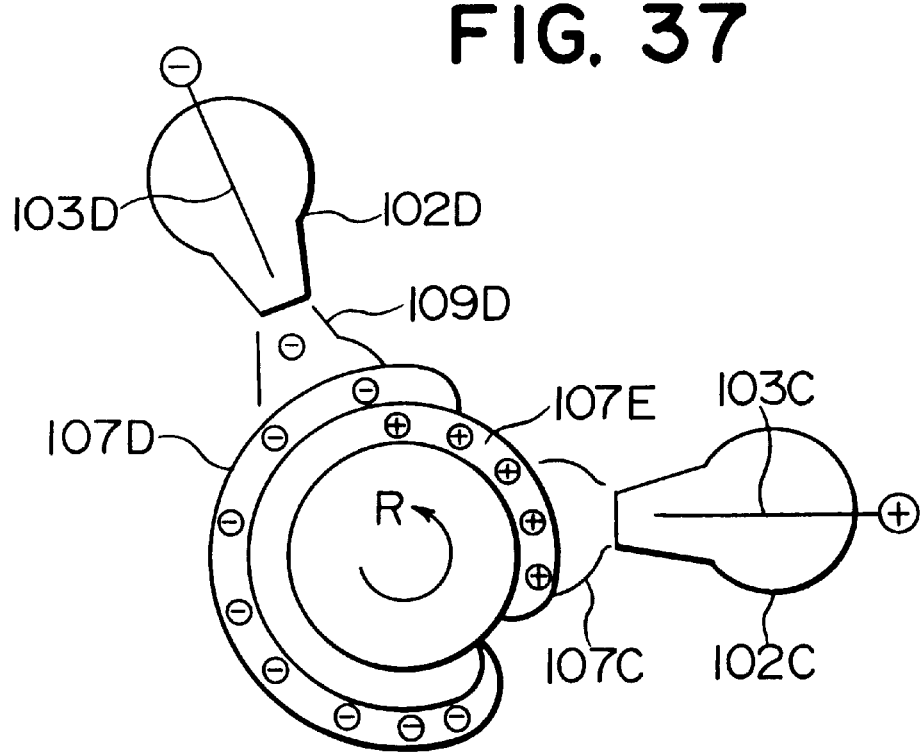
FIG. 37 is a constituent view of a modification of the sixth embodiment of an apparatus for production of an optical fiber preform of the present invention.

FIG. 37 is a partial view explaining a third experiment of the sixth embodiment of the present invention, which uses the rotational motion of the target. In this experiment, burners 102C and 102D were placed at different angular positions with respect to the target and electrode wires 103C and 103D were inserted in the burners 102C and 102D.

The electrode wires 103C and 103D were applied with respective constant polarity voltages in the same way as in the second experiment. Therefore, the flames 109C and 109D charged with a positive polarity and a negative polarity, respectively, were ejected from the burners 102C and 102D to the target.

The state of deposition of the glass particulates 107C, 107D blown from the burners 102C, 102D to be deposited on a rotating target was similar to that in the second experiment.

Therefore, the same high level of deposition of glass particulates as in the second experiment was realized by the third experiment.

The above embodiment showed the case of the OVD method, but the present invention may of course also be applied in the same way to the VAD method, for example.

According to the sixth embodiment of the present invention, flows of positively and negatively charged particulates were alternately sent to the target so that the particulates on the surface of the target charged to a positive polarity drew the particulates charged to a negative polarity by the static electric force or by the reverse relationship particulates on the surface of the target charged to a negative polarity drew the particulates charged to a positive polarity by the static electric force, whereby it was possible to vastly improve the efficiency of deposition of glass particulates on the target and it was possible to synthesize a porous preform for an optical fiber preform without waste and in turn to produce optical fiber at a low cost.

The present invention is not limited to the above-mentioned first to sixth embodiments and may take the form of various modifications.

For example, the embodiments explained with reference to the OVD method may also be applied to the VAD method. Further, the process and apparatus for production of an optical fiber preform of the present invention may be suitable combinations of the above-mentioned first to sixth embodiments.

Many widely different embodiments of the present invention may be constructed without departing from the spirit and scope of the present invention, and it should be understood that the present invention is not restricted to the specific embodiments described above.

We claim:

1. An apparatus for producing an optical fiber preform, comprising:
   a reaction vessel;
   an oxygen-hydrogen burner in said reaction vessel hydrolyzing a feedstock gas and which traverses a target back and forth, the target including a seed rod or a soot body formed on a seed rod, said oxygen-hydrogen burner produces glass particulate for deposition on said seed rod or said soot body;
   first charging means, separate from said target and in said reaction vessel, for charging said particulate to a first polarity and to a predetermined charge before said particulate are deposited on said target; and
   a plate electrode, provided separate from said target and in said vessel at a first position on an opposite side of said target from said first charging means, for creating an electric field having a second polarity, said second polarity being opposite said first polarity.

2. An apparatus for producing an optical fiber preform as set forth in claim 1, wherein the position facing the burner across the target has an opposite polarity from the charging polarity of the glass particulate ejected from the burner to electrically attract the particulate ejected from the burner.

3. An apparatus for producing an optical fiber preform as set forth in claim 2, said reaction vessel is adapted to reduce the humidity of the atmosphere in which the particulate are deposited on the target during the deposition of the particulate on the target.

4. An apparatus for producing an optical fiber preform as set forth in claim 1, wherein said plate electrode is located at a position facing the burner across the target and to which a voltage of an opposite polarity from the first polarity of the particulate including glass particulate ejected from the burner is applied and which electrically attracts the particulate ejected from said burner.

5. An apparatus for producing an optical fiber preform as set forth in claim 1, further comprising means for clearing any charge built up on said target by the deposition of said charged particulate.

6. An apparatus for producing an optical fiber preform as set forth in claim 1, further comprising:
   humidity detecting means for detecting the atmospheric humidity in which said particulate are deposited on said target; and
   means for reducing the atmospheric humidity as deposition occurs in response to an increase of the deposition rate of glass particulate on the target in response to the humidity detected by said humidity detecting means.

7. An apparatus for producing an optical fiber preform as set forth in claim 1, further comprising means for automatically increasing particulate amount deposited by the burner on the target at ends of the target.

8. An apparatus for producing an optical fiber preform as set forth in claim 7, wherein the means for increasing includes means for increasing the predetermined charge applied by the first charging means while said burner is positioned at the ends of said target.

9. An apparatus for producing an optical fiber preform as set forth in claim 7, wherein said means for increasing comprises means for increasing a supply of hydrogen gas and oxygen gas at ends of said target.

10. An apparatus for producing an optical fiber preform as set forth in claim 1, wherein said first charging means includes a first point electrode disposed inside said burner and a DC power source applying a DC voltage to said first electrode.

11. An apparatus for producing an optical fiber preform as set forth in claim 10, wherein said DC power source provides a controllable DC voltage to said first electrode, and
   said apparatus further comprising a sensor measuring the outer diameter of said target and outputting a signal based upon the measured diameter; and
   control means for receiving as input the output signal of the sensor and reducing the voltage of the DC power source in response to an increase in the diameter of the target.

12. An apparatus for producing an optical fiber preform as set forth in claim 1, wherein said first charging means comprises a first point electrode disposed between said burner and said target and a DC power source applying a DC voltage to said first point electrode.

13. An apparatus for producing an optical fiber preform as set forth in claim 12, wherein said DC voltage power source provides a controllable DC voltage to said first point electrode, and
   said apparatus further comprising a sensor measuring the outer diameter of said target and outputting a signal based upon the measured diameter, and
   control means for receiving as input the signal of the sensor and reducing the voltage of the DC power source in response to an increase in the diameter of the target.

14. An apparatus for producing an optical fiber preform, comprising:
   an oxygen-hydrogen burner adapted to hydrolyze a feedstock gas and which traverses a target back and forth, the target including a seed rod or a soot body formed on a seed rod, said oxygen-hydrogen burner produces glass particulate for deposition on said seed rod or said soot body;

first charging means for charging said particulate to a first polarity and to a predetermined charged before said particulate are deposited on said target;

a plate electrode, provided at a position on an opposite side of said target from said first charging means, for creating an electric field having a second polarity, said second polarity being opposite said first polarity;

means for measuring a surface potential of said target; and means for ejecting ions responsive to the measured surface potential.

15. An apparatus for producing an optical fiber preform, comprising:

an oxygen-hydrogen burner adapted to hydrolyze a feedstock gas and which traverses a target back and forth, the target including a seed rod or a soot body formed on a seed rod, said oxygen-hydrogen burner produces glass particulate for deposition on said seed rod or said soot body;

first charging means for charging said particulate to a first polarity and to a predetermined charge before said particulate are deposited on said target;

a plate electrode, provided at a position on an opposite side of said target from said first charging means, for creating an electric field having a second polarity, said second polarity being opposite said first polarity;

means for measuring a surface potential of said target; and means for controlling the amount of the feedstock gas introduced to said burner in response to the measured surface potential.

16. An apparatus for producing an optical fiber preform, comprising:

an oxygen-hydrogen burner adapted to hydrolyze a feedstock gas and which traverses a target back and forth, the target including a seed rod or a soot body formed on a seed rod, said oxygen-hydrogen burner produces glass particulate for deposition on said seed rod or said soot body;

first charging means for charging said particulate to a first polarity and to a predetermined charge before said particulate are deposited on said target;

plate electrode, provided at a position on an opposite side of said target from said first charging means, for creating an electric field having a second polarity, said second polarity being opposite said first polarity;

a drive mechanism which causes the target to traverse the burner in a longitudinal direction of said target, and which causes said target to rotate around a longitudinal axis of said target; and means for alternating the polarity of the predetermined charge in response to a direction of the traverse, and the charged particulate being deposited onto the target.

17. An apparatus for producing an optical fiber preform as set forth in claim 16, wherein the means for alternating the charge of the feedstock gas charges the glass particulate by charging the glass particulate to a positive polarity for a first predetermined time period, not charging the glass particulate for a second predetermined time period, and charging the glass particulate to a negative polarity for a third predetermined time period, the first through third predetermined periods being cyclically repeated.

18. An apparatus for producing an optical fiber preform, comprising:

an oxygen-hydrogen burner adapted to hydrolyze a feedstock gas and which traverses a target back and forth, the target including a seed rod or a soot body formed on a seed rod, said oxygen-hydrogen burner produces glass particulate for deposition on said seed rod or said soot body;

first charging means for charging said particulate to a first polarity and to a predetermined charge before said particulate are deposited on said target;

an electrode, provided at a position on an opposite side of said target from said first charging means, for creating an electric field having a second polarity, said second polarity being opposite said first polarity; and a drive mechanism which causes the target to traverse the burner in a longitudinal direction of the target and causes the target to rotate around a longitudinal axis of the target.

19. An apparatus for producing an optical fiber preform, comprising:

an oxygen-hydrogen burner adapted to hydrolyze a feedstock gas and which traverses a target back and forth, the target including a seed rod or a soot body formed on a seed rod, said oxygen-hydrogen burner produces glass particulate for deposition on said seed rod or said soot body;

first charging means for charging said particulate to a first polarity and to a predetermined charge before said particulate are deposited on said target;

a plate electrode, provided at a position on an opposite side of said target from said first charging means, for creating an electric field having a second polarity, said second polarity being opposite said first polarity; and a drive mechanism which causes the target to traverse the burner in a longitudinal direction of the target and causes the target to rotate around a longitudinal axis of the target, and said plate electrode ejecting ions onto the target before said charged particulate are produced from the burner, said ions being charged to a polarity opposite to the polarity of the particulate.

20. An apparatus for producing an optical fiber preform, comprising:

an oxygen-hydrogen burner adapted to hydrolyze a feedstock gas and which traverses a target back and forth, the target including a seed rod or a soot body formed on a seed rod, said oxygen-hydrogen burner produces glass particulate for deposition on said seed rod or said soot body;

first charging means for charging said particulate to a first polarity and to a predetermined charge before said particulate are deposited on said target;

plate electrode, provided at a position on an opposite side of said target from said first charging means, for creating an electric field having a second polarity, said second polarity being opposite said first polarity; and a drive mechanism which causes said target to traverse said burner in a longitudinal direction of said target an causes said target to rotate around a longitudinal axis of said target.

21. An apparatus for producing an optical fiber preform, comprising:

an oxygen-hydrogen burner adapted to a hydrolyze a feedstock gas and which traverses a target back and forth, the target including a seed rod or a soot body formed on a seed rod, said oxygen-hydrogen burner produces glass particulate for deposition on said seed rod or said soot body;

first charging means for charging said particulate to a first polarity and to a predetermined charge before said particulate are deposited on said target;

a plate electrode, provided at a position on an opposite side of said target from said first charging means, for creating an electric field having a second polarity, said second polarity being opposite said first polarity; and a drive mechanism which causes said target to traverse said burner in a longitudinal direction of said target and causes said target to rotate around a longitudinal axis of the target;

said plate electrode ejecting ions onto the target before said charged particulate are produced from the burner, said ions being charged to a polarity opposite to the polarity of the particulate.

22. An apparatus for producing an optical fiber preform, comprising:

a reaction vessel;

a burner in said reaction vessel, adapted to traverse a target back and forth, the target and producing particulate for deposition on the target;

a first charging device located in said reaction vessel on a first side of the target, separate from the target and charging the particulate produced by said burner with a first polarity before the particulate are deposited on the target; and a second charged device separate from the target and located in said reaction vessel on a second side of the target opposite to the first side and creating an electric field of a second polarity opposite to the first polarity.

23. An apparatus for producing an optical fiber preform, comprising:

a reaction vessel;

a target located in said reaction vessel;

a burner in said reaction vessel and producing glass particulate for deposition on the target;

a driving mechanism adapted to move said target in back and forth with respect to said burner;

a first charging device located in said reaction vessel on a first side of the target, separate from the target and charging the particulate produced by said burner with a first polarity before the particulate are deposited on the target;

a second charged device separate from the target and located in said reaction vessel on a second side of the target opposite to the first side and creating an electric field of a second polarity opposite to the first polarity; and a charge alternating mechanism adapted to change a charge of the first and second polarities responsive to the back and forth movement caused by said driving mechanism and to increase the charge applied at an end of the target.

* * * * *